Figure 1:
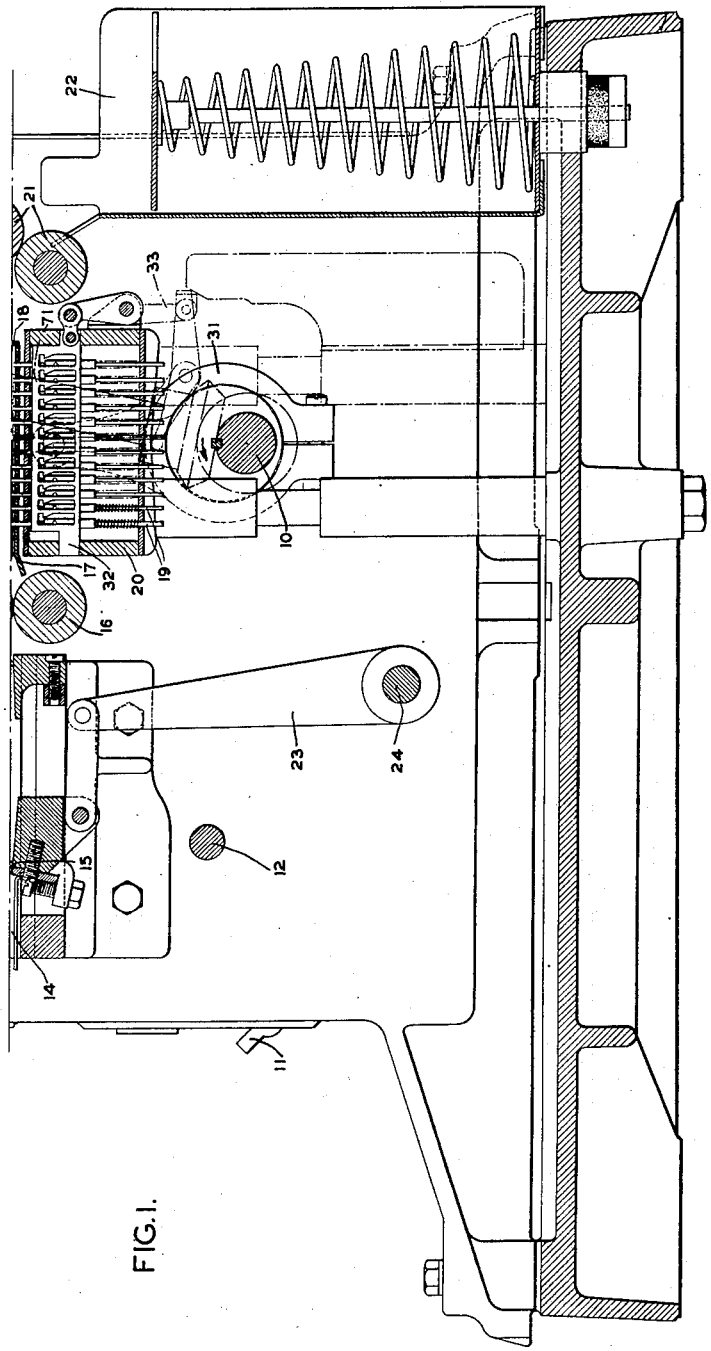

April 8, 1941.  W. W. LASKER  2,237,908
TABULATING MECHANISM
Filed July 31, 1937   15 Sheets-Sheet 2

INVENTOR
W.W. LASKER, DECEASED
W.W. LASKER, JR., EXECUTOR
BY W. A. Spark
ATTORNEY

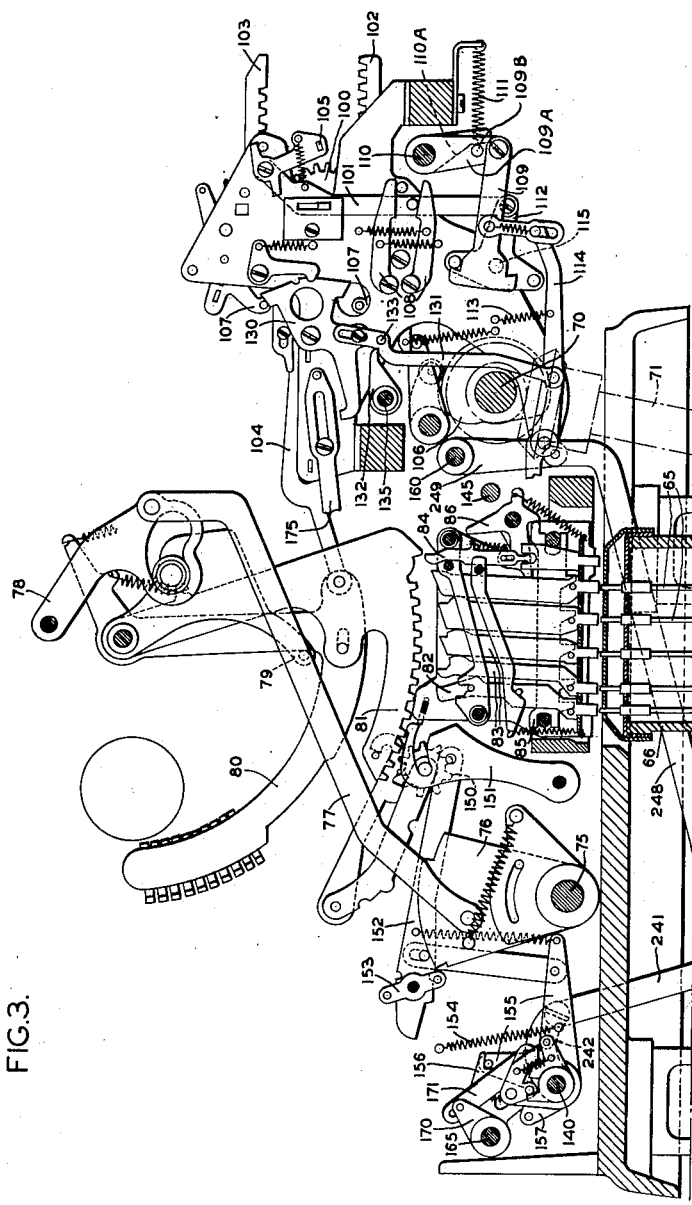

April 8, 1941. W. W. LASKER 2,237,908
TABULATING MECHANISM
Filed July 31, 1937 15 Sheets-Sheet 4

INVENTOR
W. W. LASKER, DECEASED
W. W. LASKER, JR., EXECUTOR
BY H. R. Sparks
ATTORNEY April 8, 1941.  W. W. LASKER  2,237,908
TABULATING MECHANISM
Filed July 31, 1937   15 Sheets-Sheet 5

INVENTOR
W. W. LASKER, DECEASED
W. W. LASKER, JR., EXECUTOR

BY  W. C. Sparks
ATTORNEY

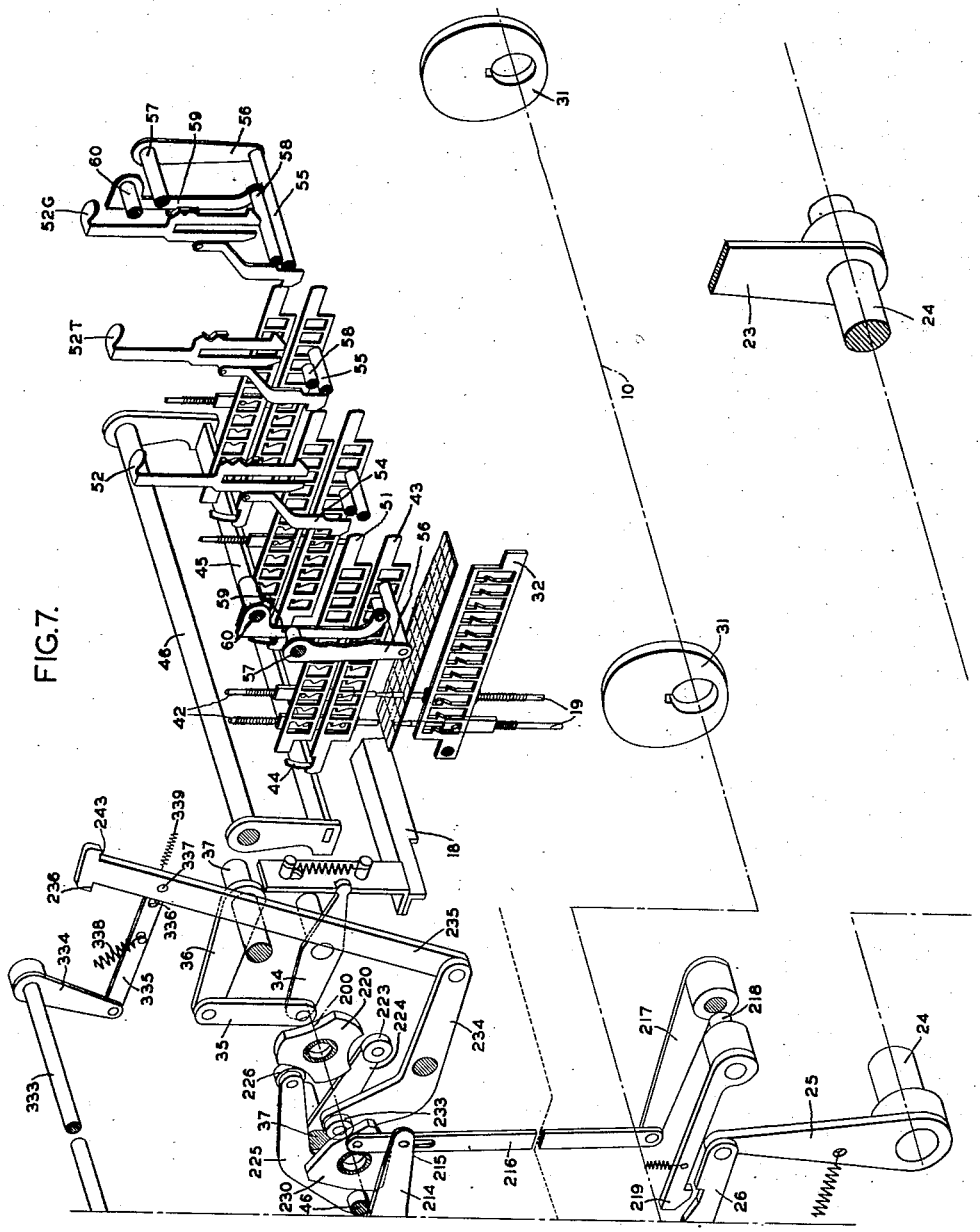

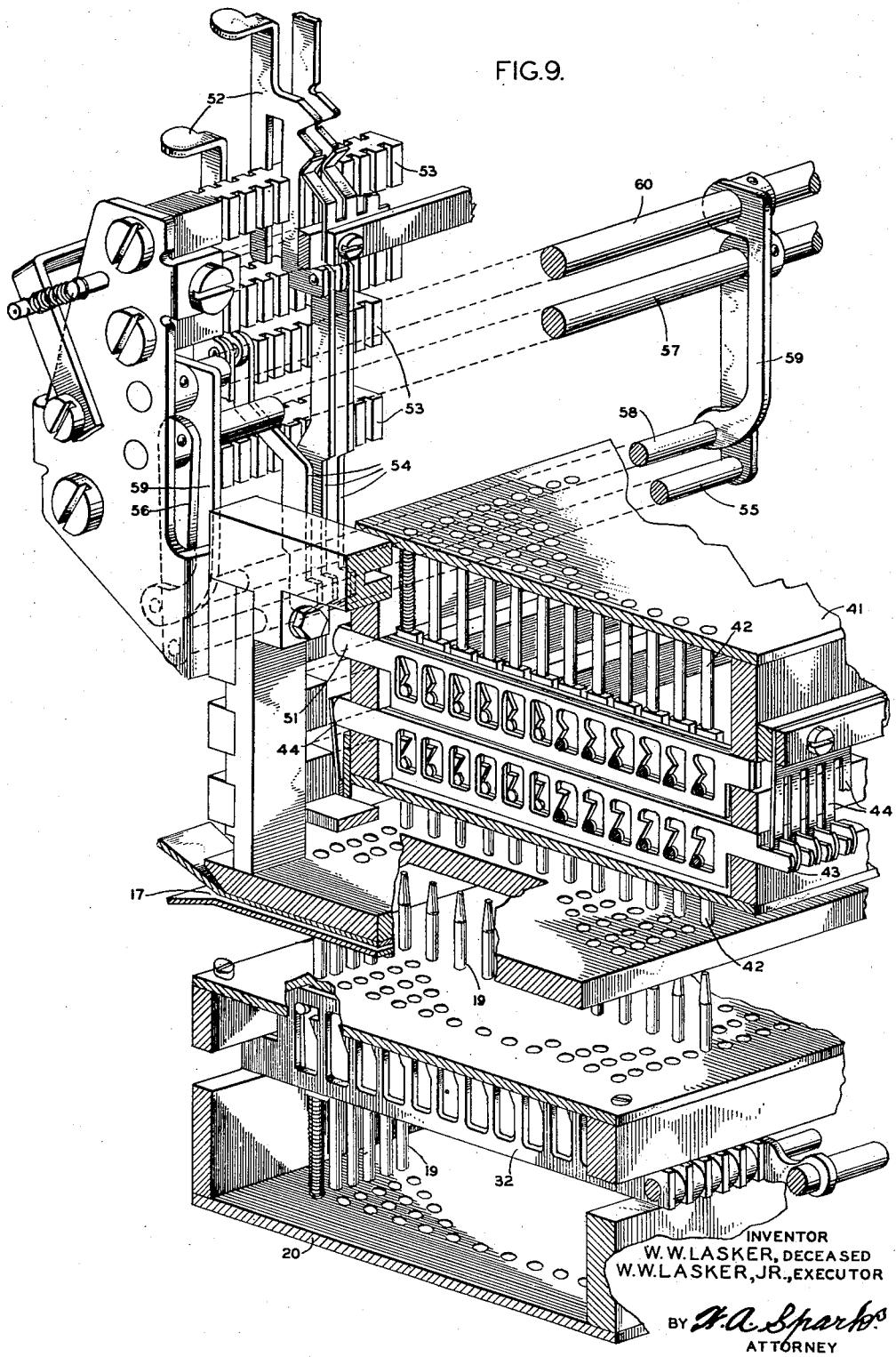

April 8, 1941.   W. W. LASKER   2,237,908
TABULATING MECHANISM
Filed July 31, 1937   15 Sheets-Sheet 8

INVENTOR
W. W. LASKER, DECEASED
W. W. LASKER, JR., EXECUTOR
BY
ATTORNEY

April 8, 1941.  W. W. LASKER  2,237,908
TABULATING MECHANISM
Filed July 31, 1937  15 Sheets-Sheet 9
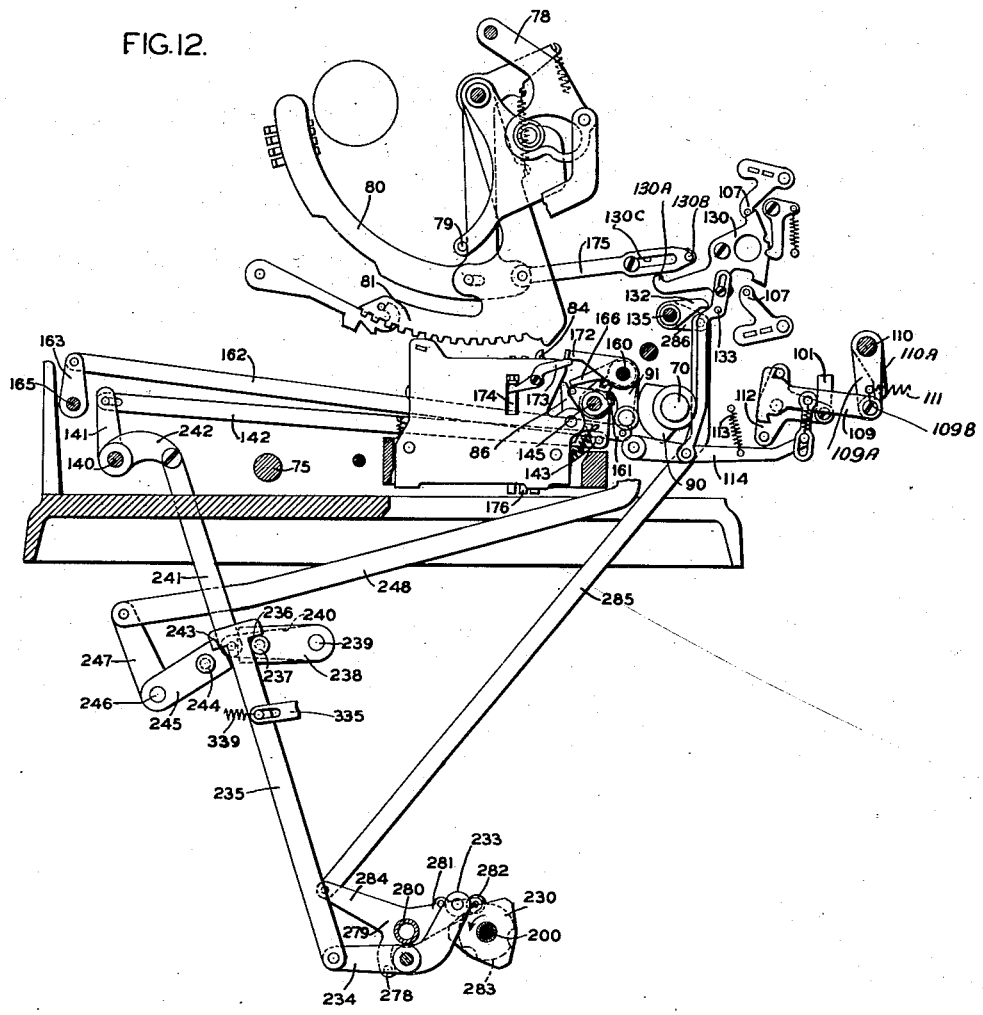
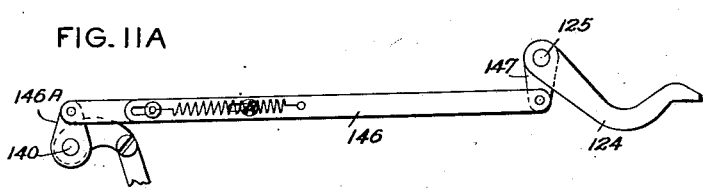
INVENTOR
W. W. LASKER, DECEASED
W. W. LASKER, JR., EXECUTOR
BY W. A. Spark
ATTORNEY April 8, 1941.                 W. W. LASKER                  2,237,908
                            TABULATING MECHANISM
                    Filed July 31, 1937          15 Sheets-Sheet 11
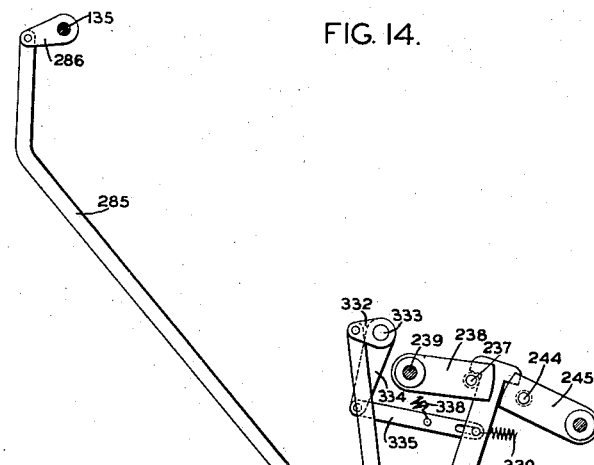
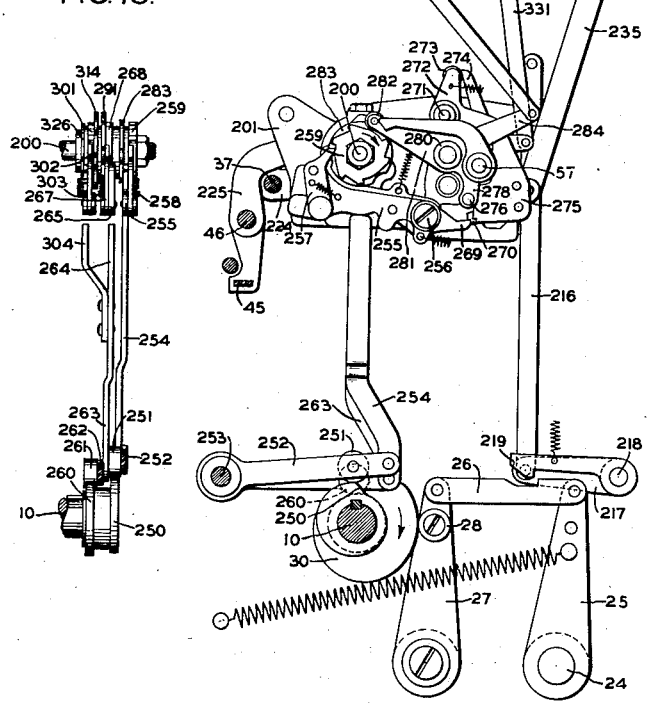
INVENTOR
W.W. LASKER, DECEASED
W.W. LASKER, JR., EXECUTOR
BY  *W. A. Sparks*
                ATTORNEY April 8, 1941.                    W. W. LASKER                    2,237,908
                            TABULATING MECHANISM
                    Filed July 31, 1937          15 Sheets-Sheet 12

INVENTOR
W.W. LASKER, DECEASED
W.W. LASKER, JR., EXECUTOR
BY H.A. Sparks
ATTORNEY April 8, 1941.  W. W. LASKER  2,237,908
TABULATING MECHANISM
Filed July 31, 1937  15 Sheets-Sheet 13

INVENTOR
W. W. LASKER, DECEASED
W. W. LASKER, JR., EXECUTOR

BY *W. A. Spark*
ATTORNEY

April 8, 1941.  W. W. LASKER  2,237,908
TABULATING MECHANISM
Filed July 31, 1937  15 Sheets-Sheet 15
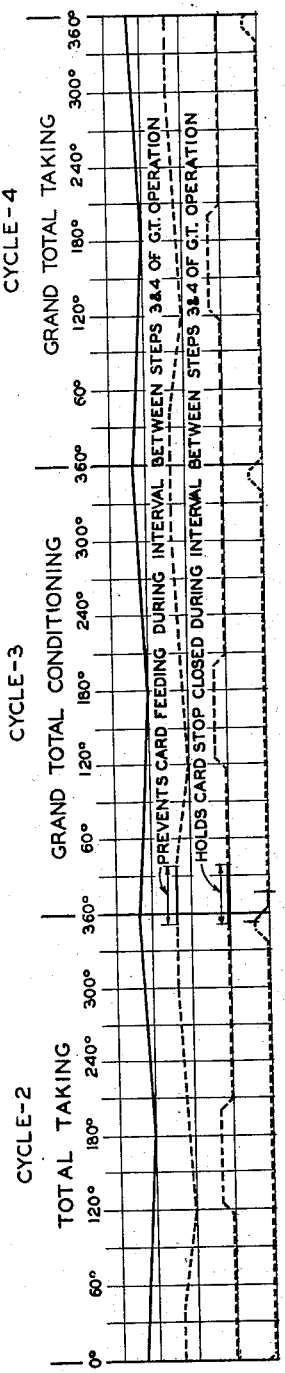
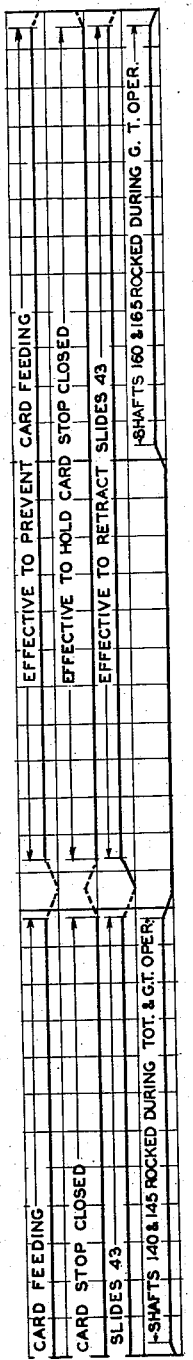
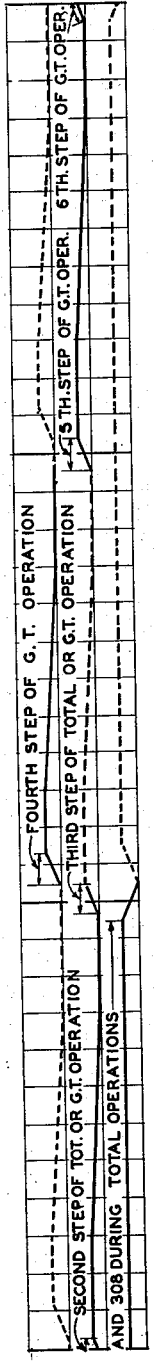
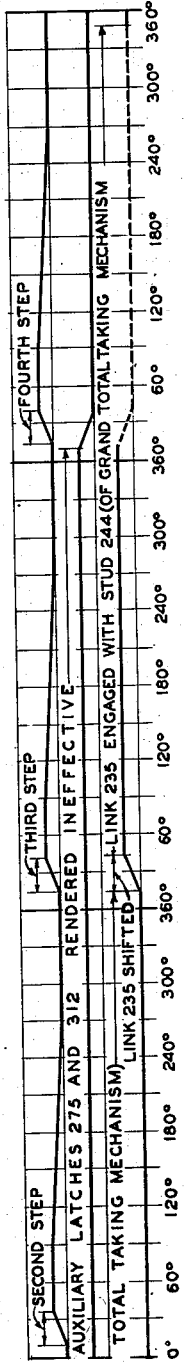
FIG. 27A
INVENTOR
W.W. LASKER, DECEASED
W.W. LASKER JR., EXECUTOR
BY
ATTORNEY

UNITED STATES PATENT OFFICE 2,237,908

TABULATING MECHANISM

William W. Lasker, deceased, late of Brooklyn, N. Y., by William W. Lasker, Jr., executor, Brooklyn, N. Y., assignor to Remington Rand Inc., Buffalo, N. Y., a corporation of Delaware Application July 31, 1937, Serial No. 156,692

5 Claims. (Cl. 235—61.7)

This invention relates to record card controlled tabulating machines and particularly to total taking control mechanisms therefor.

This application is a continuation in part of copending application of W. W. Lasker, S. N. 684,438, filed August 8, 1933, now Patent No. 2,185,258, dated January 2, 1940, and is a further development of the total taking control mechanism disclosed in the patent to W. W. Lasker, No. 2,044,119, issued June 16, 1936.

The principal object of this invention is to provide a control mechanism for controlling machine functions during total taking operations initiated by changes in the group designation of successive records, and for controlling machine functions during grand total taking operations initiated by changes in grand group designations.

Another object of the invention is to provide means for effecting successive total taking operations without the use of control cards.

Another object of the invention is to provide a control mechanism for effecting successive total taking operations upon a change in grand group designation, in the first of which a total is taken from one accumulator, in the second, a grand total is taken from another accumulator.

Another object of the invention is to provide means to shift from group total control to grand total control during successive operations of the control mechanism.

Another object of the invention is to provide means to prevent successive operations of the control mechanism when a group total is taken.

Other objects of the invention are disclosed in the course of the specification.

Figure 2:
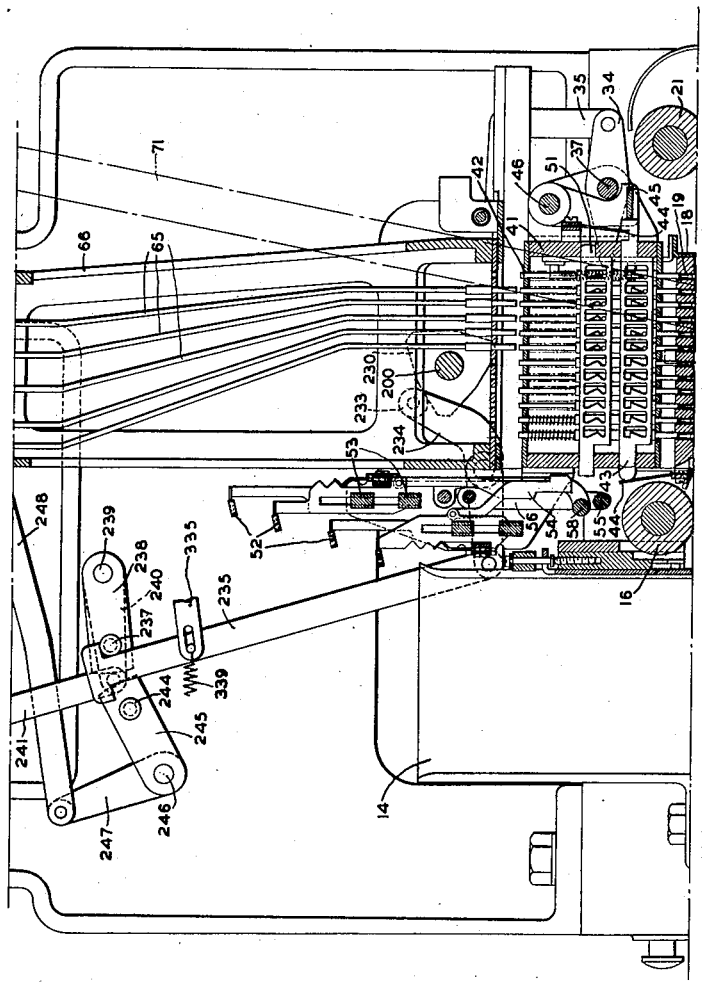
Figure 4:
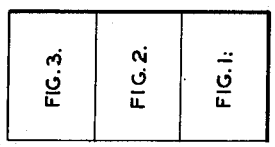
Figure 5:
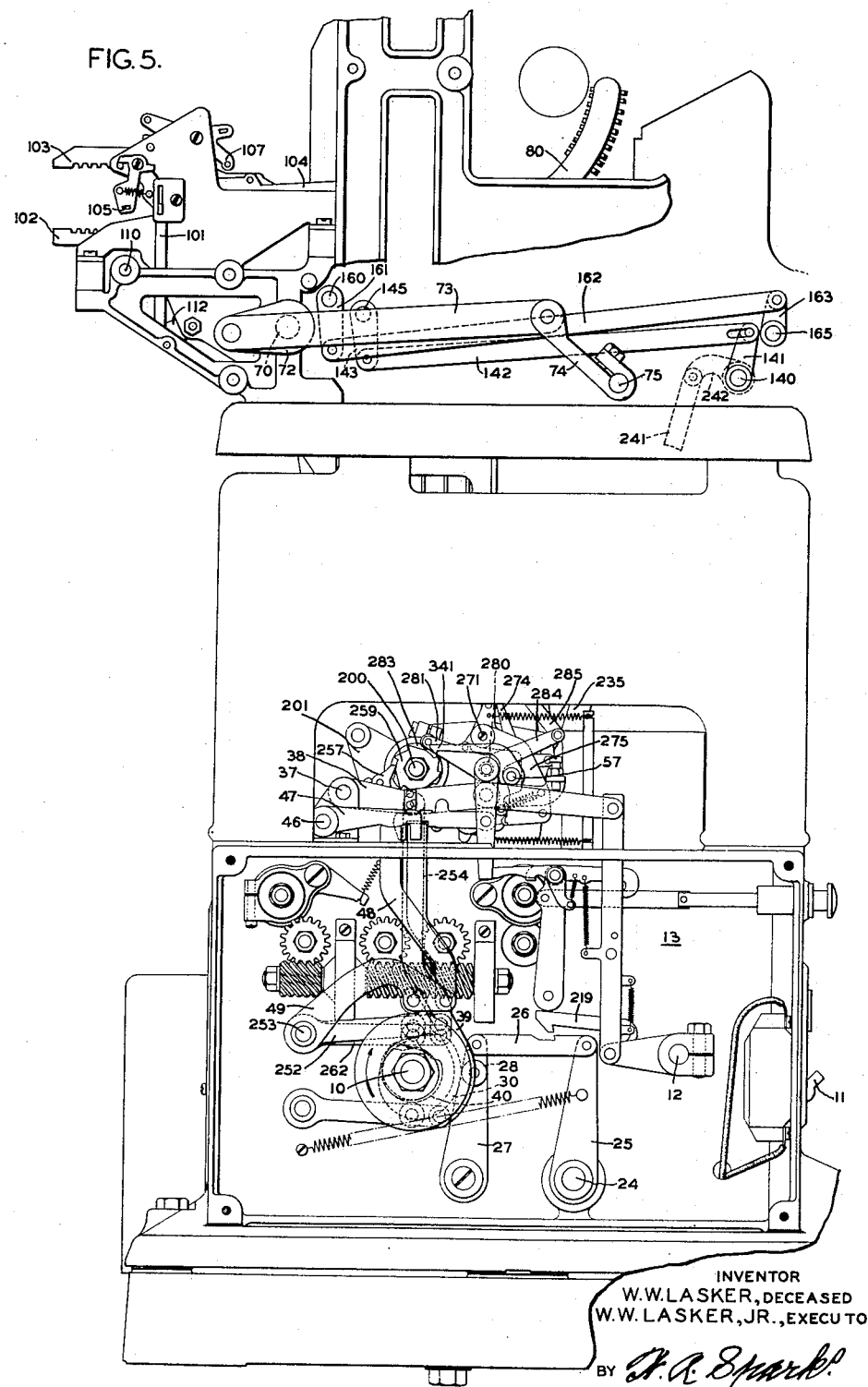
Figures 6, 7, 8:
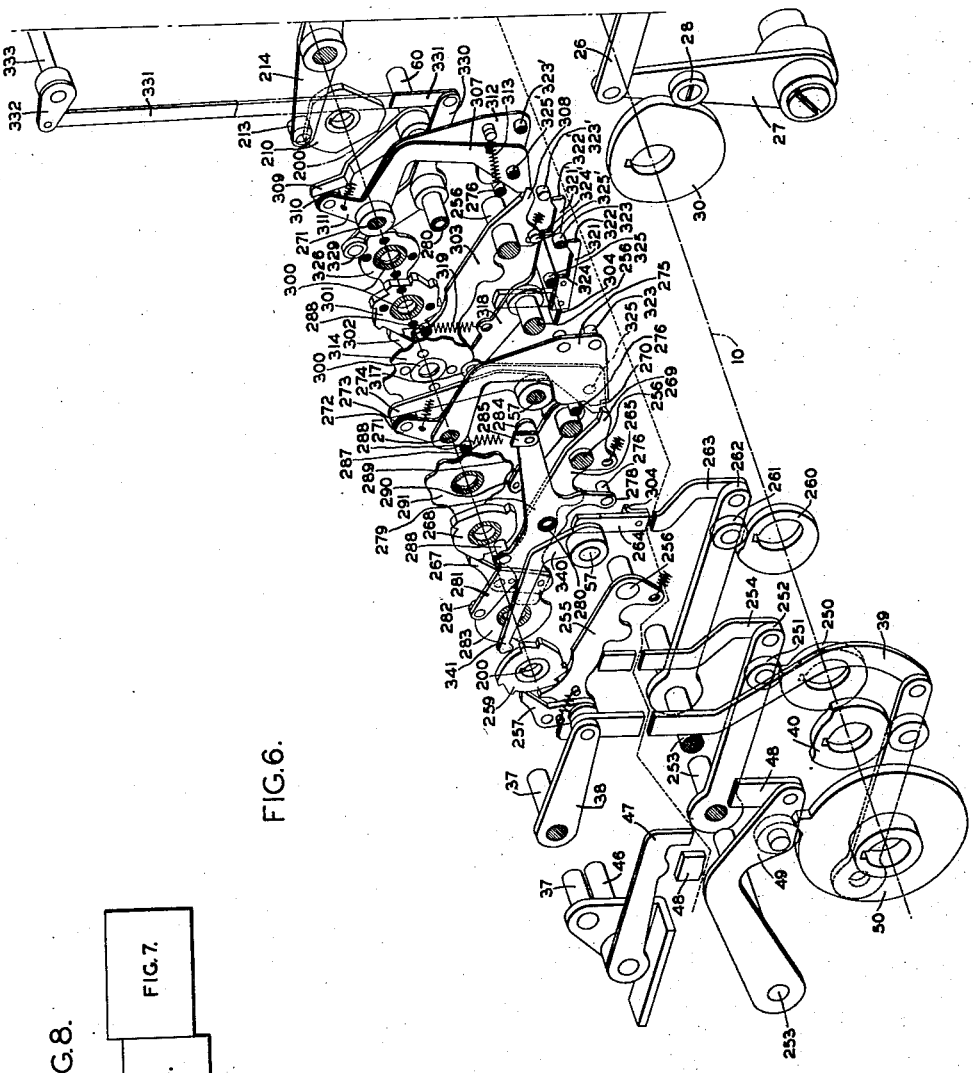
Figure 11:
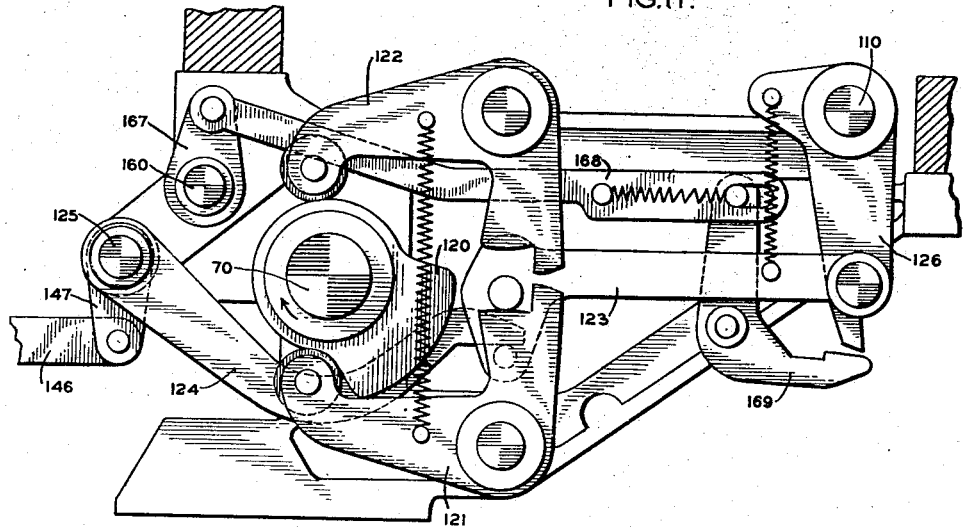
Figure 10:
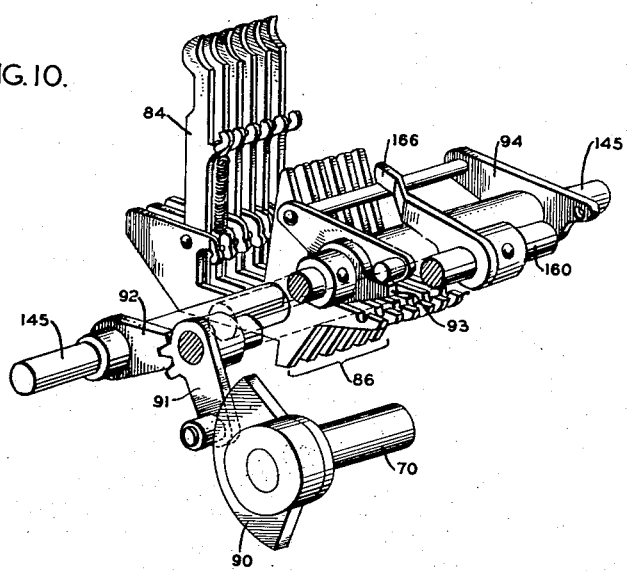
Figure 13:
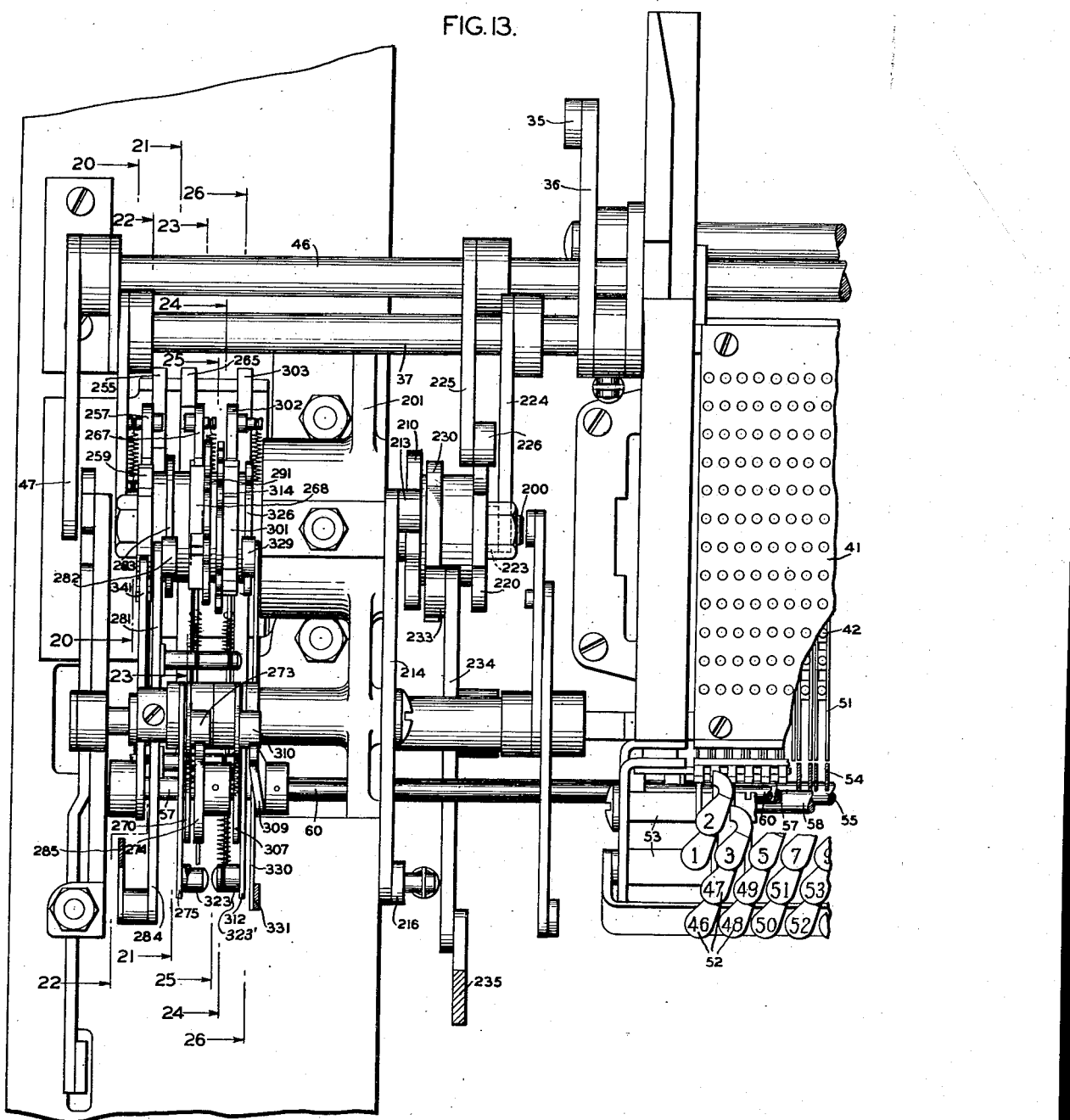
Figure 18:
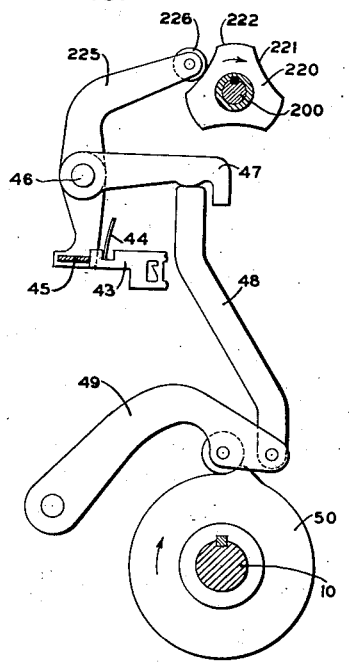
Figure 16:
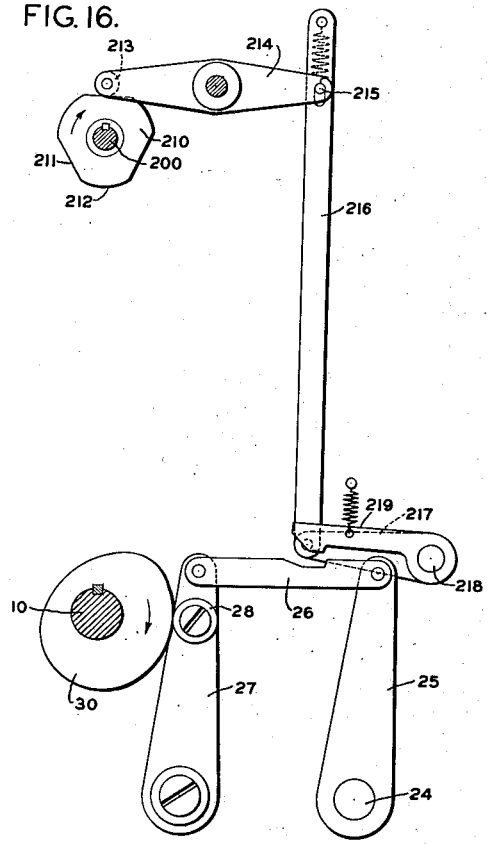
Figure 17:
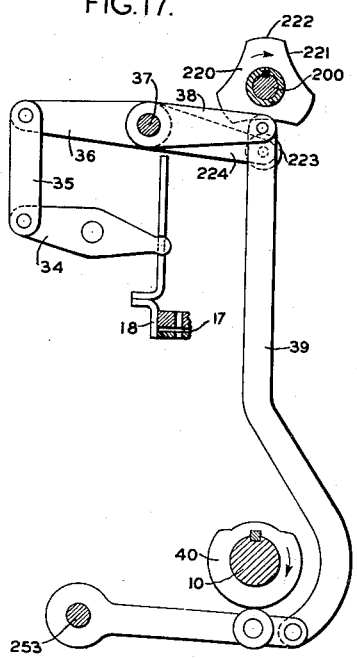
Figure 19:
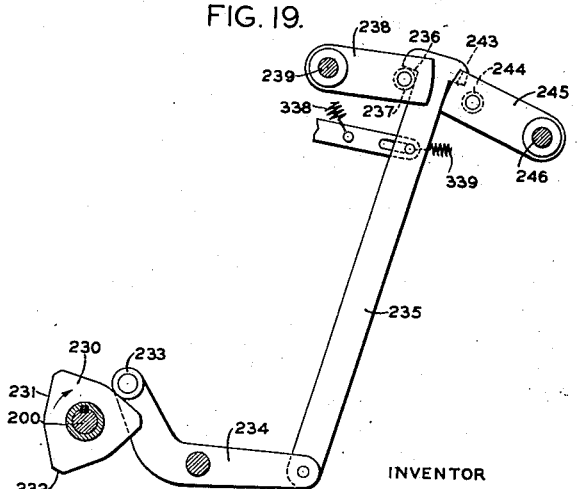
Figure 20:
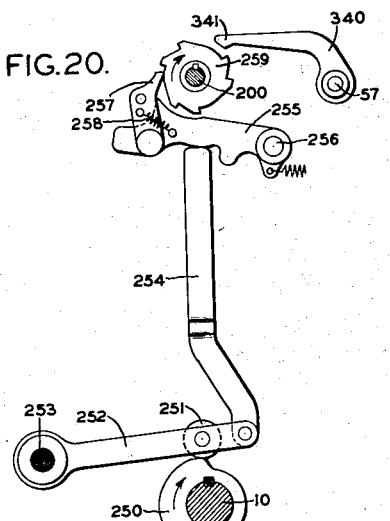
Figure 21:
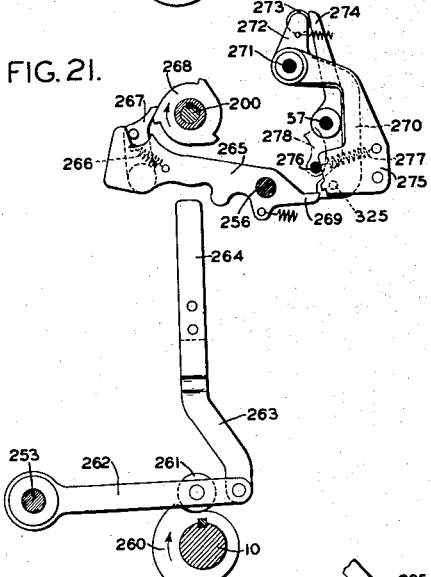

One embodiment of the invention is illustrated in the accompanying drawings, in which, Figs. 1, 2, and 3 represents a conventional sectional elevation through a typical Powers tabulator equipped with the invention, Fig. 4 indicates the manner in which Figs. 1, 2, and 3 are arranged, Fig. 5 is a left side elevation of the tabulator of Figs. 1, 2, and 3 with portions of the framework removed, Figs. 6 and 7 represents an exploded isometric view of the total taking control mechanism and the associated mechanisms, Fig. 8 indicates the manner in which Figs. 6 and 7 are arranged, Fig. 9 is a sectional isometric view of the reading retaining mechanism and the change of designation sensing mechanism, Fig. 10 is a sectional isometric view of the zero stop depressor mechanism, Fig. 11 is a right side sectional elevation of a portion of the rear accumulator timing mechanism, Fig. 11A is a right side view of a portion of the timing mechanism for the rear accumulator, Fig. 12 is a schematic sectional view of the credit balance mechanism and the mechanism for controlling the designating type carrier, Fig. 13 is a plan view of the total taking control mechanism, Fig. 14 is a left side elevation of the total taking control mechanism, Fig. 15 is a rear elevation of the actuating mechanism for the total taking control mechanism, Fig. 16 is a fragmentary sectional elevation of the card feeding mechanism and the controls therefor, Fig. 17 is a fragmentary sectional elevation of the card stop mechanism and the control therefor, Fig. 18 is a fragmentary sectional elevation of the retract mechanism and controls for the reading retaining mechanism, Fig. 19 is a fragmentary sectional elevation of the total cam and associated mechanism, Figs. 20, 21, 22, and 23 are sectional elevations of the actuating mechanism of the total taking control mechanism taken along lines 20—20, 21—21, 22—22, 23—23, respectively, of Fig. 13, and Figs. 24, 25, and 26 are sectional elevations of the additional mechanism of the total taking control mechanism taken along lines 24—24, 25—25, 26—26, respectively, of Fig. 13.

Figure 27:
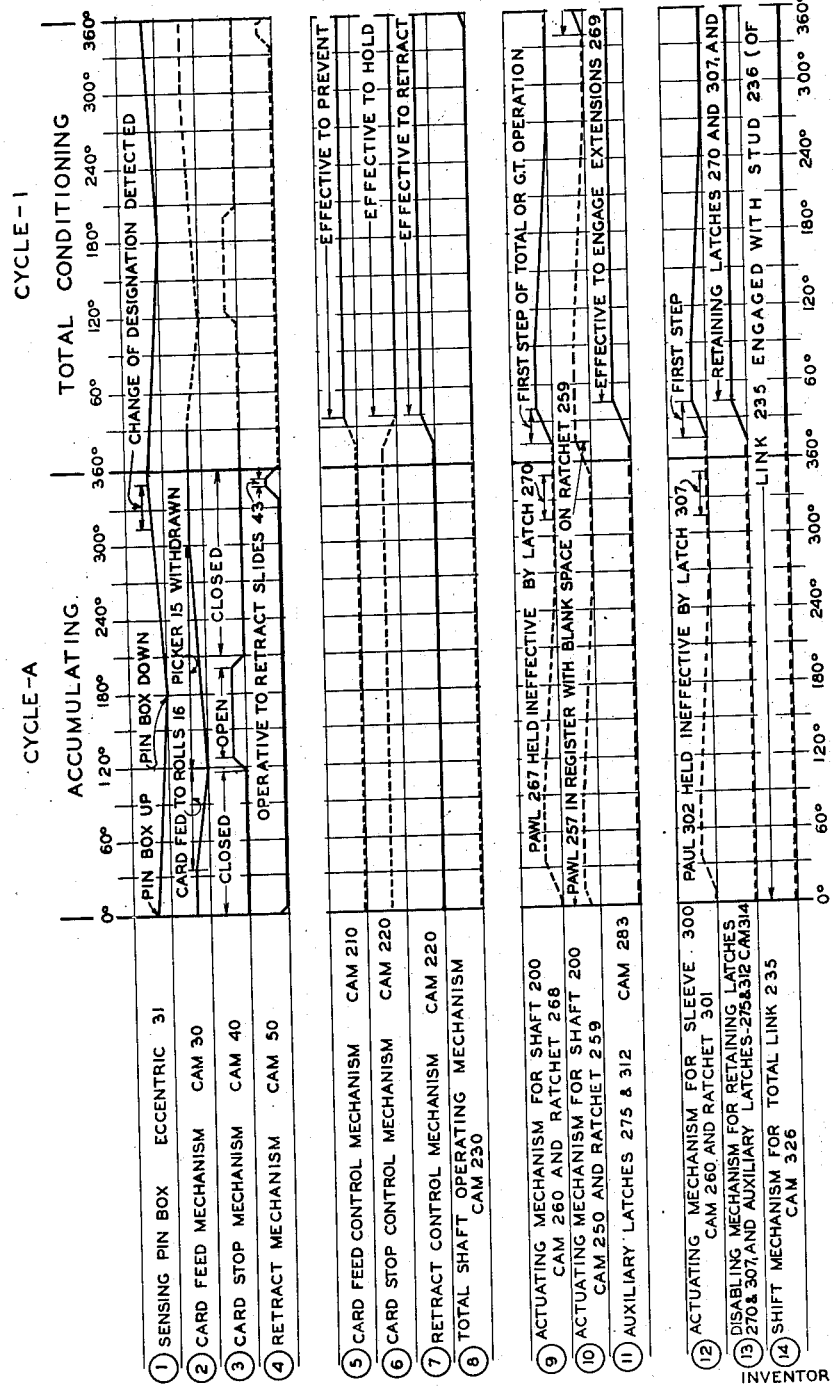

Figs. 27 and 27A, taken together, form a timing chart.

In Patent No. 2,044,119 a total taking control mechanism is disclosed that is arranged to control total taking operations in a tabulator having one or more group total accumulators. This control mechanism operative upon a change of designation in successive records, is adapted to vary the normal tabulating functions of the machine and to control the sequence of operations necessary for taking a total in the Powers tabulator. For this purpose, the control mechanism operates through three steps to control first, a conditioning cycle in which the accumulator transfer mechanisms are normalized, second, a total taking cycle in which the group total is rolled out of the accumulator, and third, a normalizing cycle in which the control mechanism is restored to rest position and the data in the new card is tabulated. In patent of W. W. Lasker No. 2,066,406, issued January 5, 1937, the same control mechanism is adapted to control total taking and grand total taking operations in a tabulator equipped with the familiar Powers direct subtraction and grand total mechanism similar to that originally disclosed in co-pending application of W. W. Lasker et al., S. N. 535,842, filed May 8, 1931, now Patent No. 2,124,177, dated July 19, 1938. In a tabulator of this type, the items that comprise each group are entered into a group total accumulator during accumulating cycles, the totals of each group are transferred to a grand total accumulator during total taking operations, and the grand total of a plurality of groups are taken from the grand total accumulator during grand total taking operations. In this arrangement, the control mechanism operates as in Patent No. 2,044,119 during total taking operations, however when a grand total is to be taken, the last group total must be transferred to the grand total accumulator prior to the taking of the grand total. Therefore, to effect the operations that comprise a grand total taking operation two control cards are inserted in the card pack at the point where a grand total is required. The first control card initiates the operation of the control mechanism thereby causing the last group total to be taken and is then ejected. The second control card initiates a second operation of the control mechanism and at the same time shifts its control to the grand total accumulator thereby causing the grand total to be taken. The total taking control mechanism of the present invention is arranged to control both total taking and grand total taking operations upon changes in group and grand group designations, respectively, and in each case, to retain the new card in the card chamber throughout the operation initiated thereby, so that the data contained therein may be tabulated in the succeeding accumulating cycle.

Although total taking control mechanisms, based upon the principle disclosed herein, may be constructed for any type of tabulating machine in which successive totals are to be taken, the device shown herein is applied to a well known form of Powers tabulator in which it is particularly adapted to operate.

In the embodiment shown in the drawings, a form of the present invention is applied to a tabulating machine having a computing mechanism similar to that disclosed in Patent No. 2,124,177, and containing certain modifications disclosed in Patent No. 2,066,406. The base mechanism of this machine comprises driving mechanism, card feeding mechanism and card sensing mechanism that is substantially the same as that disclosed in Patent No. 2,044,119, and includes a change of designation sensing mechanism and reading retaining mechanism that are similar to those disclosed in copending application of W. W. Lasker, S. N. 656,233, filed February 11, 1933, now Patent No. 2,151,406, dated March 21, 1939. Powers tabulating machines, containing the above mentioned mechanisms, are being regularly manufactured and have been in general commercial use for several years. Therefore, a brief description of the manner of operation of these mechanisms will suffice for the purposes of the present disclosure. To facilitate the understanding of the mechanisms involved, the specification has been divided into three major headings, namely, Base mechanism, Computing mechanism, and Total taking control mechanism.

Throughout the specification it will be understood that all shafts, levers, and movable parts generally are supported on or carried by the main framework of the machine, even though such is not specifically shown or mentioned. All links and link-like elements will be considered as pivotally connected to the associated elements unless otherwise specifically stated. Many elements consist of two parts joined together for the purpose of assembly or adjustment. Furthermore, many of the arms are provided with keyways, set screws, or friction clamps for corresponding adjustments. In general, such construction is not shown, for to do so would unnecessarily complicate the drawings. Many elements, for example the several total shafts, have oscillatory movements. Suitable limit stops are provided therefor to prevent over-running, or under-running, or both. Such stops will not be further mentioned or described for their existence will be tacitly assumed. In many instances spring clips, cotter pins, enlarged or riveted heads, or other fastening devices are omitted from both the drawings and the detailed description. Unless otherwise specifically mentioned, the expression "mounted on," as applied to arms, cams, etc., connotes that the element is "fixed on" or "rigidly connected to" the associated shaft. The terms "forward," "rearward," "upper," "lower," "right," "left," and their grammatical variations occur throughout this specification. These terms refer to the relative locations of the parts as viewed from the front of the machine. Thus, "forward" always means to the left in Figs. 1-3, inclusive, whereas "rearward" means to the right. The adoption of these conventions will considerably shorten the detailed description without detracting from the clarity of the described mode of construction and operation. Furthermore, certain of the expressions frequently used herein, although well known in the art, are defined for the sake of clarity, as follows:

Group—the smallest subdivision of records to be tabulated, comprising one or more record cards.

Grand group—the next larger subdivision of records to be tabulated, comprising one or more groups of record cards.

Group designation—the designative data common to all of the cards of a group.

Grand group designation—the designative data common to all of the cards of a grand group.

Group total (or, total)—the total of the quantitative data contained in all the cards of a group.

Grand group total (or, grand total)—the total of the quantitative data contained in all the cards of a grand group.

Group total conditioning cycle (or, total conditioning cycle)—the cycle in which the machine is conditioned for yielding a group total.

Group total taking cycle (or, total taking cycle)—the cycle in which the group total accumulator is cleared and the group total printed on the report sheet. In addition, in the present instances, the group total is transferred to the grand total accumulator, and the total taking control mechanism is normalized.

Grand group total conditioning cycle (or, grand total conditioning cycle)—the cycle in which the machine is conditioned for yielding a grand total.

Grand group total taking cycle (or, grand total taking cycle)—the cycle in which the grand total accumulator is cleared and the grand total printed on the report sheet. In addition, in the present instance, the total taking control mechanism is normalized.

Group total taking operation (or, total taking operation)—the entire sequence of cyclical operations, involved in the taking of a group total, which is initiated as the result of the sensing of a change in group designation. In the present instance a group total taking operation comprises:

1, a group total conditioning cycle, and
    2, a group total taking cycle.

Grand group total taking operation (or, grand total taking operation)—the entire sequence of cyclical operations, involved in the taking of a grand group total, which is initiated as the result of the sensing of a change in grand group designation. In the present instance, a grand group total taking operation comprises:

1, a group total conditioning cycle,
    2, a group total taking cycle,
    3, a grand group total conditioning cycle, and
    4, a grand group total taking cycle.

*Base mechanism*

The operations of the tabulator are controlled from a main drive shaft 10 (Figs. 1, 5, 6, 7) which is driven by an electric motor (not shown), controlled by switch 11, and is connected thereto by means of a clutch (not shown), mounted on rock shaft 12 controlled by a clutch operating mechanism generally designated by reference character 13 (Fig. 5) which is similar in function and operation to that disclosed in Patent No. 2,044,119, the arrangement being such that a cycle of operation is completed during each revolution of shaft 10. As described in said patent, the clutch mechanism is so arranged that when the machine is stopped it is always stopped at a given point in a cycle. The point selected is one at which the several machine elements are in such position that the operator may conveniently perform any required manual operation such as the insertion of a new translator, the insertion of a new report sheet, the resetting of the change of designation sensing mechanism, etc. This condition occurs when shaft 10 (Fig. 1) is rotated to a position in which the keyway therein is in its top dead center position, as shown in the drawings, and is referred to as the normal or stopping position of the machine. Thus, for the purposes of this description, each machine cycle "begins" when the keyway in shaft 10 moves counter-clockwise from its dead center position, and "ends" when the keyway is returned thereto.

Record cards placed in card magazine 14 (Figs. 1 and 2) are successively passed, by means of picker knife 15 to feed rolls 16 which convey them to card sensing chamber 17. Each card is retained in the card chamber by card stop 18 during the period in which it is sensed by spring urged sensing pins 19, mounted in reciprocable pin box 20, and then, is passed by the usual skid rolls (not shown) to eject rolls 21 by which it is conveyed to receiving magazine 22.

Picker knife 15 of the card feeding mechanism (Figs. 1, 6, 7, 16) is connected to arm 23 mounted on rock shaft 24 and is operated, through arm 25, link 26, arm 27 and follower 28, by card feed cam 30 mounted on shaft 10. The arrangement is such that the card feeding mechanism is operated once during each cycle of operation and is held retracted by cam 30 when the machine is in its normal or stopping position, as shown in the drawings (see Fig. 27, line 2, cycle A).

The sensing pin box 20 (Fig. 1) is provided with a plurality of rows of spring pressed pins 19, arranged to register with the perforation positions in the record cards, and is reciprocated during each cycle of operation by a pair of eccentrics 31 mounted on shaft 10. The arrangement of eccentrics 31 being such that, in the normal or stopping position of the machine, the pin box is raised to its highest position (see Fig. 27, line 1, cycle A). Each row of sensing pins is provided with the usual locking slide 32 arranged to lock the pins in elevated position when they have passed through perforations in a card. The usual mechanism, similar to that disclosed in Patent No. 2,044,119 and indicated herein by lever 33, is provided to prevent the operation of slides 32 when there is no card in chamber 17.

Card stop 18 (Figs. 1, 2, 6, 7, 17) is operated in the usual manner, through lever 34, link 35, arm 36, shaft 37, arm 38, and link 39, by card stop cam 40 mounted on shaft 10. The arrangement is such that card stop 18 is operated once during each cycle of operation, and is held in effective position by cam 40 when the machine is in its normal or stopping position (see Fig. 27, line 3, cycle A).

Mounted in the frame of the machine above the sensing pin box is an intermediate pin box mechanism (Figs. 2, 7, 9) having the same function as the corresponding mechanism in Patent No. 2,044,119, namely, to retain the set-up contained in the record cards and to sense changes in the designation data in successive cards. The intermediate pin box mechanism shown in the drawings has been modified in the manner disclosed in Patent No. 2,151,406 to permit the use of the well-known Powers ninety column card and to permit different types of totals to be taken when different types of designation changes are sensed. This mechanism comprises a box like structure 41 provided with a plurality of rows of spring pressed pins 42 arranged to register with sensing pins 19. The springs associated with pins 42 are stronger than the springs associated with pins 19, as in Patent No. 2,044,119, so that, in the event pin box 20 is elevated when there is no card in chamber 17, pins 19 are held down and do not elevate stops in the computing units. The sets of pins in each column, that correspond to the upper and lower zones of a record card, are each provided with a locking slide 43 that is urged rearwardly by spring 44. A plurality of locking faces on each slide 43 cooperate with studs on the associated pins 42 (Figs. 6 and 7) to hold the pins in raised position when elevated by sensing pins 19. Locking slides 43 are retracted, in the manner and for the purpose described in Patent No. 2,044,119, during the period in which pins 42 are held up by pins 19, by means of bail 45, rock shaft 46, arm 47, push rod 48, arm 49, and retract cam 50, mounted on shaft 10 (see Fig. 27, line 4, cycle A). Retraction of slides 43 releases all pins 42 that were elevated under control of the preceding card and permits them, unless held up due to a corresponding perforation in the new card, to be moved to their lower position by the associated springs.

The change of designation sensing mechanism includes a plurality of cam slides 51 (Figs. 2, 7, 9) arranged in a manner similar to locking slides 43, that is, a cam slide 51 being provided for each set of pins 42 that correspond to each column of perforation positions in the record cards. A plurality of camming faces on each slide 51 coact with studs on the associated pins 42, the arrangement being such that any change in the setting, that is, the raising or lowering, of a pin 42 in any column serves to move the associated slide 51 forwardly (to the left in Fig. 2). The movement of slides 51 is utilized, in the manner described in Patent No. 2,151,406, to initiate the operation of the total taking control mechanism. For this purpose, a plurality of variably settable keys 52 (Figs. 2, 7, 9, 13), one for each cam slide 51, are slidably mounted on transverse comb pieces 53 and each is provided with a pivotally connected interponent member 54. Each key 52 is manually settable to an upper, an intermediate, or a lower position in each of which it is retained by a detent spring arranged to engage with notches in the key. The lower end of interponent 54 is so formed that when key 52 is in its upper position, movement of slide 51 is ineffective thereon. When key 52 is placed in its intermediate position, as indicated at 52T of Fig. 7, interponent 54 is moved between the end of slide 51 and a bail rod 55 that is supported by arm 56 mounted on a rock shaft 57. Under these circumstances, movement of slide 51 serves to rock shaft 57 to initiate the operation of the total taking control mechanism as will be described hereinafter. When key 52 is placed in its lower position, as indicated at 52G of Fig. 7, interponent 54 maintains an operative relationship between slide 51 and bail rod 55 and, in addition, a shoulder on the interponent establishes contact with a second bail rod 58 that is supported by arms 59 mounted on rock shaft 60. Under these circumstances, movement of slide 51 serves to rock shaft 57 to initiate the operation of the total taking control mechanism and, in addition, serves to rock shaft 60 to initiate the operation of additional control mechanism, hereinafter described, which causes a repetition of the operation of the total taking control mechanism, and, at the end of the first total taking operation varies the control of the total taking control mechanism, which is normally arranged to cause totals to be taken from the total accumulators, to cause the total to be taken from the grand total accumulator.

Thus, when a total is to be taken upon a change of designation in a given column, key 52, corresponding to that column, is set in its intermediate position; whereas, when a grand total is to be taken upon a change of designation in another column, key 52, corresponding to that column, is set in its lower position. Keys 52 that correspond to the remaining columns are then set in their upper positions so that the movements of the associated slides 51 are ineffective.

The movements of pins 42 are transmitted to the computing mechanism, in the usual manner, by translator wires 65 (Fig. 2) slidably mounted in a removable translator frame 66.

*Computing mechanism*

By way of illustration, the mechanism of the present invention is shown in conjunction with the familiar Powers direct subtraction and grand total mechanism, the function and manner of operation of which is fully disclosed in Patent No. 2,124,177 and embodies certain modifications disclosed in Patent No. 2,066,406. This mechanism comprises a rear accumulator arranged to accumulate positive and negative amounts and a front accumulator arranged to accumulate grand totals of the totals taken from the rear accumulator. The arrangement is such that the front accumulator is conditioned to non-add during accumulating operations so that the quantitative data taken from the record cards is entered only in the rear accumulator. When a total is taken from the rear accumulator, the front accumulator is conditioned for an adding operation so that the total taken from the rear accumulator is transferred to the front accumulator during the total taking operation. When a grand total is to be taken, the total of the last group of items is transferred to the front, and then, the grand total is taken therefrom. Grand total taking is completed during a series of operations, in the first part of which, the rear accumulator is conditioned for total taking and the front accumulator is conditioned for accumulating to effect the necessary transfer. In the latter part of the series of operations, the front accumulator is conditioned for total taking, whereby the grand total is printed and the rear accumulator is conditioned for a non-adding operation to prevent an improper transfer of the grand total. The mechanism for performing these functions is being regularly manufactured and has been in general commercial use for several years. Therefore, a brief description thereof is sufficient for the purposes of the present disclosure. To avoid unnecessary repetition, only a single computing section, comprising a front accumulator and a rear accumulator and the several controls therefor, has been shown in the drawings. It is to be understood that any suitable number and type of computing sections may be added, as described in Patent No. 2,066,406 and Patent No. 2,124,177 to form a complete machine according to the particular type of accounting problem that is to be handled.

The several mechanisms in the computing section are controlled primarily by a drive shaft 70 (Fig. 3) which is driven by base drive shaft 10 (Fig. 1) through an arrangement of bevel gears and an inclined shaft 11 as in Patent No. 2,066,406 so that shaft 70 makes a complete revolution for each revolution of shaft 10. The rotary movement of shaft 70 is converted, by means of crank 72, link 73, and arm 74 (Fig. 5) to impart oscillating movement, during each cycle of operation, to rock shaft 75 on which is mounted the usual fan cam 76 (Fig. 3) that forms a part of the timing mechanism of the front accumulator. Fan cam 76 also controls the oscillating movement of the type carriers by means of link 77 connected to an arm 78 that is provided with a bean-shaped cam slot for a follower roller on the type carrier restoring bail 79. The arrangement of bail 79 is such that it retains type carriers 80, and thereby the associated gear sectors 81, in their rearward position during the period in which digit stops are being raised by the sensing mechanism.

The mechanism for positioning type carriers 80 (Fig. 3) consists of the usual Powers, ninety-column stop basket, similar in function to an earlier form disclosed in patent to W. W. Lasker, No. 1,780,621, issued November 4, 1936, that consists of a plurality of columns of stop elements, each column comprising a "nine" stop 82, four digit stops 83 and a zero stop 84 which are adapted to engage a heel on gear sector 81. The arrangement is such that elevation of any stop 82 or 83 serves to position type carrier 80 for printing the corresponding odd digit, whereas the elevation of a stop 83 in conjunction with "nine" stop 82 serves to position the type carrier for printing the next higher even digit. Stops 82 and 83 are provided with the usual stud that co-operates with a cam face on slide 85 so that the elevation of any digit stop serves to move slide 85 rearwardly (to the right in Fig. 3), against an ear on spring urged bell-crank 86, to lower, or hold lowered, the zero stop 84 whereby type carrier 80 is freed to move forwardly.

In order to relieve a portion of the load that is placed on a translator wire 65 in raising a digit stop and simultaneously lowering the zero stop, additional means are provided for lowering all zero stops 84 during each cycle of operation. This mechanism comprises a zero stop depressor cam 90 (Figs. 10, 12) mounted on shaft 70 which actuates an arm 91, pivotally mounted on the rear grand total shaft 160, provided with teeth that cooperate with a toothed arm 92 fast on the rear total shaft 145. Also mounted on rear total shaft 145 is a finger 93 that underlies a stud in a bail 94 that cooperates with the vertical arms of bell cranks 86 to which the zero stops are resiliently connected. When the roller on arm 91 rides onto the high dwell of cam 90, bail 94 is rocked counter-clockwise thereby rocking bell-cranks 86 counter-clockwise to lower zero stops 84. Cam 90 serves to depress the zero stops during the period in which the digit stops are raised by the translator wires and to release the zero stops prior to the time that restoring bail 79 moves forwardly. Thus, if a digit stop is raised in a given column, slide 85 holds the zero stop depressed after the follower on arm 91 rides off the high dwell on cam 90 so that the type carrier may move forwardly when restoring bail 79 is released; whereas, if a digit stop is not raised, the zero stop is elevated by the spring on bell-crank 86 before the restoring bail is released and serves to hold the type carrier in its rearward position.

Rear accumulator

The rear accumulator mechanism shown in the drawings (Figs. 3 and 12) is the usual Powers direct subtraction mechanism comprising an accumulator 100 supported by links 101, a plurality of adding racks 102 for inserting positive amounts in the accumulator, and a plurality of subtracting racks 103 for inserting negative amounts in the accumulator, each set of racks being joined by a spring and pin-in-slot connection to a forked link 104 which is in turn connected to type carrier 80. Accumulator 100 is provided with bail 105 mounted on links 101 for locking the accumulator wheels in stationary position when disengaged from the actuating racks, mechanism for effecting transfers from each accumulator wheel to the adjacent wheel of higher order, means controlled by cam 106 on shaft 70 for restoring tripped transfer pawls during the period in which the actuating racks 102, 103 are moved forwardly, and a closed cycle carrying mechanism indicated by levers 107, for inserting the fugitive one when the accumulator passes through zero, all as disclosed in Figs. 2 and 3 of Patent No. 2,066,406.

The mechanism for causing the engagement and disengagement of accumulator 100 and its actuating racks is also the same as that disclosed in Patent No. 2,066,406. This mechanism includes a pair of spring urged centering arms 108 that serve to shift the accumulator to a middle or disengaged position unless otherwise controlled. A T-shaped link 109, connected to an arm 109A pivotally mounted on a rock shaft 110, is urged rearwardly by a strong spring 111 and is normally engaged, by means of spring 113 and lever 114, with an upper stud on a T-shaped lever 112, pivotally mounted at 115, to cause the engagement of the accumulator with adding racks 102. When an item is to be subtracted, a special perforation in the card causes lever 114 to be rocked clockwise to engage link 109 with the lower stud on lever 112 and thereby cause the engagement of accumulator 100 with subtracting racks 103. During accumulating cycles, the usual timing mechanism (Fig. 11) which is mounted on the extreme right side of the machine and comprises cam 120 mounted on shaft 70, bell-cranks 121 and 122, pitman 123 which is held in engagement with bell-crank 121 during accumulating cycles by arm 124 on rock shaft 125, and arm 126 mounted on shaft 110, serves to rock shaft 110 clockwise. The movement of shaft 110, through an arm 110A mounted thereon and a stud 109B on arm 109A, serves to shift pitman 109 forwardly against the tension of spring 111 to permit the disengagement of the accumulator immediately prior to the time at which the actuating racks move forwardly and to effect the engagement of the accumulator immediately prior to the time at which the actuating racks are returned.

When a total is to be taken from the rear accumulator, means hereinafter described vary the normal accumulating timing of the machine so that the last accumulating cycle is followed by a conditioning cycle and then a total taking cycle. During the conditioning cycle the accumulator transfer mechanism is returned to normal position and, in addition, the accumulator is conditioned for engagement with either the adding racks 102 or the subtracting racks 103 in accordance with the characteristic of the total standing thereon. This latter function is performed by the credit balance mechanism, as fully disclosed in Patent No. 2,066,406, which comprises a pivotally mounted controller 130 (Fig. 3), operable by either one of the levers 107 of the closed cycle carrying mechanism, and a link 131 connected to lever 114, an arm 132 capable of coacting with a stud 133 on link 131 and mounted on a credit balance rock shaft 135 which is rocked during the conditioning cycle. The arrangement is such that when the characteristic of the total standing on accumulator 100 passes from negative to positive, lower lever 107 rocks controller 130 counter-clockwise to shift stud 133 out of the path of movement of the arm 132 and thereby permits spring 113 to condition the accumulator for engagement with racks 102, as in adding operations, whereas, when the characteristic of the total standing on accumulator 100 passes from positive to negative, upper lever 107 rocks controller 130 clockwise to shift stud 133 into the path of movement of arm 132 and thereby causes lever 114 to be rocked clockwise to condition the accumulator for engagement with racks 103, as in subtracting operations. During each total taking cycle, a front total shaft 140 (Fig. 12) is rocked clockwise and in turn, by means of a linkage comprising arm 141, link 142 and arm 143 located on the left side of the machine, serves to rock the rear total shaft 145 counter-clockwise, and thereby hold zero stops 84 depressed to permit all type carriers and associated accumulating racks to move forwardly. On the extreme right side of the machine is a linkage (see Figs. 11 and 11A), comprising an arm 146A mounted on front total shaft 140, link 146 and arm 147 mounted on rock shaft 125, which serves to rock shaft 125 counter-clockwise during a total taking cycle, thereby raising arm 124 to permit pitman 123 to be drawn upwardly by its spring and engage bell-crank 122. By this arrangement, pitman 123 is operated during the latter half of the total taking cycle whereby accumulator 100 is retained in engagement with actuating racks 102 or 103 during the forward movement of the racks and the amount standing on the accumulator is rolled out and printed on the report sheet.

*Front accumulator*

The mechanism for accumulating grand totals comprises the well known Powers front accumulator mechanism that has been modified as disclosed in Patent No. 2,124,177, and Patent No. 2,066,406. This mechanism comprises an accumulator 150 (Fig. 3) which is variably engaged with and disengaged from gear sectors 81 for different types of operation by cam arms 151 in accordance with the position of pitman 152 operable by rocker arm 153 and fan cam 76. Pitman 152 may be set in an upper position in which it controls an accumulating operation, a lower position in which it controls a total taking operation, and an intermediate position in which it controls non-adding operations. Pitman 152 is resiliently urged to its upper position by spring 154 acting on bell-crank 155 but is held in its intermediate position during item accumulating cycles by a pivotally mounted latch 156 so that the items from each card are entered only on rear accumulator 100. When a total is taken from the rear accumulator, front total shaft 140 is rocked as stated above, and arm 157, mounted thereon, disengages latch 156 and permits spring 154 to shift pitman 152 to its upper position for controlling an accumulating operation whereby the total, rolled out of accumulator 100 during the forward movement of the actuators, is rolled into, or transferred to, accumulator 150 as the actuators are returned.

When a grand total of a series of totals is to be taken from the front accumulator, means hereinafter described vary the normal operation of the machine so that the last total transferring operation is followed by a grand total conditioning cycle and then a grand total taking cycle. During the conditioning cycle, the transfer mechanism of accumulator 150 is normalized in the usual manner. During the grand total taking cycle, the total taking control mechanism rocks rear grand total shaft 160 (Fig. 3) counter-clockwise which in turn, by means of arm 161, link 162, and arm 163 (Fig. 12), rocks front grand total shaft 165 clockwise. Mounted on rear grand total shaft 160 is an arm 166 (Fig. 10) arranged to depress bail 94 to depress zero stops 84 and effect the release of the actuating racks during the grand total taking cycle. Mounted on front grand total shaft 165 (Fig. 3) is an arm 170 connected to bell-crank 155 by link 171, whereby, when shaft 165 is rocked, bell-crank 155 is rocked to shift pitman 152 to its lower position. This movement conditions accumulator 150 to yield the grand total during the grand total cycle.

Also mounted on rear grand total shaft 160 (Fig. 11) is an arm 167 connected to a link 168 which is joined by a pin-in slot connection to a pivotally mounted latch 169 adapted to engage a pendent extension on arm 126. The latter linkage serves to condition rear accumulator 100 for a non-adding operation during the grand total taking cycle to prevent a retransfer of the grand total to the rear accumulator, as described in Patent No. 2,124,177.

*Item and total designating mechanism*

The computing mechanism may be provided with mechanism similar to that shown in Patent No. 2,066,406 for printing a special sign on the same line with each negative item and with each different type of total. For this purpose in each computing unit, the extreme right-hand type carrier 80 (Fig. 12) is not used for computing purposes but is provided with four special character type slugs, namely, "—", "GT", "CR", and "T", which are arranged for presentation to the platen in the order named. When a card containing a negative item is sensed, the special perforation therein, that serves to indicate the negative characteristic and to rock lever 114, also serves to elevate stop 176. Stop 176 is arranged to operate the usual cam slide 85 (not shown in Fig. 12) to hold zero stop 84 depressed, and to position type carrier 80 for printing the "—" sign beside the negative item. When rear grand total shaft 160 is rocked during a grand total taking cycle, an arm 172, mounted thereon, rocks lever 173, pivotally mounted on the stop basket frame, to elevate a stop 174 whereby the type carrier is positioned for printing "GT". If a group total is taken when the characteristic of the amount standing on rear accumulator 100 is negative, a hook 130A on controller 130 engages a stud 130B on link 175, connected to type carrier 80, and positions the type carrier for printing "CR" beside the total. If a group total is taken when the characteristic of the amount standing on rear accumulator 100 is positive, the hook 130A on controller 130 is out of the path of the stud 130B and link 175 is free to move to the end of its path of travel, as limited by a slot 130C, to position the type carrier for printing a "T" beside the total.

*Total taking control mechanism*

In order that totals and grand totals may be taken upon changes in designative data, a total taking control mechanism is provided that is arranged to control a total taking operation, upon a change in the group designation, during which the total is taken from rear accumulator 100, and to control a grand total taking operation upon a change in grand group designation, during which the total of the last group of cards is taken from accumulator 100 and, then, the grand total of all the preceding group totals is taken from accumulator 150. The mechanism for effecting these operations is based upon the principles disclosed in Patent No. 2,044,119. As disclosed in the cited patent, when a card with a new designation is sensed, a total taking operation is initiated during which the total taking control mechanism operates to perform five distinct functions, namely, 1. To suspend card feeding during the conditioning and total taking cycles, 2. To retain the new card in the card chamber during the conditioning and total taking cycles, 3. To render the reading retaining mechanism ineffective during the conditioning and total taking cycles, 4. To rock the total shaft of the computing mechanism during the total taking cycle, and 5. To restore the total taking control mechanism to ineffective position at the end of the total taking cycle and thereby permit resumption of ordinary accumulating operations. The mechanism for performing these functions consists of a plurality of cams, mounted on a common shaft, and a stepping device, operable by a cam on the main drive shaft of the machine, for actuating the common shaft.

The total taking control mechanism of the present invention is designed primarily for controlling total taking and grand total taking operations in a machine having computing mechanism, as above described, in which totals are transferred to another accumulator during total taking operations. For controlling these operations, the mechanism operates to perform the five functions listed above during a total taking operation, and, in addition, to perform seven distinct functions during grand total taking operations, namely, 1. To suspend card feeding during the total conditioning, total taking, grand total conditioning, and grand total taking cycles, 2. To retain the new card in the card chamber during the above four cycles, 3. To render the reading retaining mechanism ineffective during the above four cycles, 4. To rock the total shaft of the computing mechanism during the total taking cycle, 5. To shift the control of total taking control mechanism from total control position to grand total control position at the end of the total taking cycle, 6. To rock the grand total shaft of the computing mechanism during the grand total taking cycle, and 7. To restore the total taking control mechanism to ineffective position at the end of the grand total taking cycle and thereby permit resumption of ordinary accumulating operations.

The mechanism for performing these functions comprises a plurality of cams, mounted on a common shaft 200 (Figs. 2, 5, 6, 7, 13-26) that is journaled in a bracket 201 (Figs. 5, 13) secured to the frame of the machine as in Patent No. 2,044,119, and an actuating mechanism for said shaft.

When a card with a new group designation is sensed, the operation of the actuating mechanism is initiated and this mechanism serves to rotate shaft 200 through one-third of a revolution in three steps during two machine cycles. The mechanism for actuating shaft 200, hereinafter described, differs slightly from that disclosed in Patent No. 2,044,119, wherein each actuation of the corresponding shaft occurred at the time the sensing pin box was in its highest position, in that, in the present case, the first step of each sequence occurs shortly after the sensng pin box has reached its highest position and the second and third steps occur at the time the pin box reaches its highest position. In the first step, the cams mounted on shaft 200 vary the normal accumulating operation of the machine and control a total conditioning cycle. In the second step, these cams control a total taking cycle. In the third, the total taking control mechanism is restored to ineffective position to permit resumption of ordinary accumulatng operations. As in Patent No. 2,044,119, the construction of the control mechanism is such that a complete revolution of shaft 200 is completed in nine steps. Therefore, since the cams mounted thereon perform their functions in three steps, each cam is provided with three separate working portions. Thus, after shaft 200 is actuated through three steps, the cams thereon are, in effect, returned to their original positions.

*Control of card feeding mechanism*

In order to suspend the operation of the card feeding mechanism during the conditioning and total taking cycles, a cam 210 (Figs. 6, 7, 16) is mounted on shaft 200. Cam 210 has three low dwells 211 and three high dwells 212. When the total taking mechanism is at rest, a follower roller 213 lies on one of the low dwells 211. On the first step of rotation of shaft 200, one of the high dwells 212 moves under roller 213 and holds it in its upper position during the conditioning cycle (see Fig. 27, line 5, cycle 1. At the second step of shaft 200, roller 213 continues on the high dwell and remains thereon during the total taking cycle (see Fig. 27A, line 5, cycle 2). At the third step of shaft 200, roller 213 rides down onto the next low dwell 211. Follower 213 is mounted on a lever 214 pivoted on a stud in bracket 201 (Fig. 13), and is provided at its forward end with a pin 215 which is resiliently held in the upper end of a slot in a link 216. The lower end of link 216 is connected to an arm 217 mounted on rock shaft 218 which is provided at its other end with a latch 219 arranged to engage a shoulder on link 26 of the card feeding mechanism. During the period that follower 213 rides the high dwell of cam 210, latch 219 is depressed to engage the shoulder in link 26 and thereby hold the card feeding mechanism in its extreme forward positon to prevent card feeding during the conditioning and total taking cycles. When the control mechanism is restored at the end of the total taking cycle, latch 219 is disengaged to permit the card feeding mechanism to resume ordinary operation (as in Fig. 27, line 2, cycle A).

*Control of card stop mechanism*

In order to hold the card containing the change of designation in card chamber 17 during the total conditioning and total taking cycles, means are provided for retaining card stop 18 in its lower or effective position during this period. To this end shaft 200 has mounted thereon a cam 220 (Figs. 7, 17) having three concave portions 221 and three concentric high dwells 222. In ordinary accumulating operations, during which the total taking control mechanism is at rest, a follower 223 on arm 224, mounted on rock shaft 37 of the card stop mechanism, moves idly against a concave portion 221 of cam 220. The first movement of shaft 200, during a total taking operation, brings a high dwell 222 against follower 223 to hold shaft 37 rocked and thereby hold card stop 18 in its effective position during the conditioning cycle (see Fig. 27, line 6, cycle 1). After the second step of shaft 200, follower 223 remains on the high dwell 222 to maintain card stop 18 in effective position during the total taking cycle (see Fig. 27A, line 6, cycle 2). The third step of shaft 200 places a low portion of cam 220 opposite roller 223 and thus restores card stop 18 to the control of its regular operating mechanism (as in Fig. 27, line 3, cycle A).

Control of retract mechanism

As disclosed in Patent No. 2,044,119, during each machine cycle, the sensing mechanism is arranged to elevate the digit stops of the computing mechanisms and then return to a position in which it is ineffective on the digit stops, prior to the time that gear sectors 81 (Fig. 3) start forwardly. During accumulating operations the digit stops are locked in their raised positions for the remainder of the cycle by the reading retaining mechanism. Obviously, if the digit stops, raised in accordance with the perforations in the card containing the change in designation, were locked in their raised position they would interfere with the total taking operation initiated by the new card. To prevent this occurrence, an arm 225 (Figs. 7, 18), having a follower roller 226 arranged to cooperate with cam 220, is mounted on shaft 46 of the retract mechanism of locking slides 43. During tabulating operations, follower 226 moves idly against a low dwell 221 of cam 220. When a total taking operation is initiated, the first movement of shaft 200 brings a high dwell 222 of cam 220 against follower 226 to rock shaft 46 and hold it in rocked position during the conditioning cycle, thereby causing bail 45 to shift all locking slides 43 forwardly in which position they are incapable of locking pins 42 (see Fig. 27, line 7, cycle 1). After the second step of shaft 200, follower 226 remains on high dwell 222 to hold bail 45 in rocked position whereby slides 43 are maintained in ineffective position during the total taking cycle (see Fig. 27A, line 7, cycle 2). The third step of shaft 220 places a low portion 221 of cam 220 opposite roller 226 and thus restores the reading retaining mechanism to the control of its regular operating mechanism (as in Fig. 27, line 4, cycle A). Thus, slides 43 of the reading retaining mechanism are rendered ineffective during the conditioning and total taking cycles so that pins 42 move idly up and down with sensing pins 19 and do not set digit stops in the computing mechanisms. However, the third actuation of shaft 200, which occurs at the end of the total taking cycle and at a time when sensing pin box 20 is in its highest position, serves to render slides 43 effective so that the pins 42 which were raised in accordance with perforations in the new card are locked in elevated position and set digit stops in the computing mechanism, whereby the data in the new card is accumulated during the succeeding cycle.

Since pins 42 move up and down during the conditioning and total taking cycles, it is apparent that the upper studs thereon coact with the cam faces on slides 51 of the change of designation sensing mechanism and serve to shift them forwardly against interponents 54 that are set as at 52T and 52G in Fig. 7 during the movement of the pins in each direction. Thus, this movement occurs four times during a total taking operation, i. e., first, immediately after the start of the total taking operations as pins 42 move downwardly at the beginning of the conditioning cycle, second, as pins 42 move upwardly at the end of the conditioning cycle, third, immediately thereafter as the pins move downwardly at the beginning of the total taking cycle, and fourth, as the pins move upwardly at the end of the total taking cycle. These movements resemble those which occur when a true change of designation is sensed but differ therefrom in that they occur only as an incident to a total taking operation and are not an inherent function of the mechanism during accumulating cycles. For this reason they are referred to as adventitious changes of designation and are discussed further hereinafter.

Control of total shafts

In order to set the several mechanisms of the computing mechanism for taking a total, front total shaft 140 must be rocked at the beginning of the total taking cycle and held rocked during that cycle. For this purpose, there is mounted on shaft 200, a triangular shaped cam 230 (Figs. 2, 7, 12, 19) having six low portions 231 and three high portions 232. When the total taking control mechanism is at rest, a low portion 231 is opposite a follower roller 233 mounted on a lever 234 which is pivotally mounted on a stud in bracket 201 and is connected at its forward end to a link 235. The upper end of link 235 is provided with two shoulders one of which, shoulder 236, cooperates with a stud 237 on an arm 238 mounted on a rock shaft 239 which is journaled in a suitably mounted bracket (not shown). An arm 240 (Figs. 2, 3, 12) mounted on the other end of rock shaft 239 is connected by link 241 with an arm 242 on front total shaft 140. At the first actuation of shaft 200, the adjacent low portion 231 is moved under follower 233 and, therefore, no motion is imparted to the associated linkage during the conditioning cycle (see Fig. 27, line 8, cycle 1). At the second actuation of shaft 200, a high portion 232 is placed in register with follower 233, thereby actuating the associated linkage to rock front total shaft 140 clockwise and hold it rocked throughout the total taking cycle (see Fig. 27A, line 8, cycle 2). At the third actuation of shaft 200, follower 233 rides onto a low portion of cam 230, thereby permitting total shaft 140 to be restored by its spring (not shown) to return the computing mechanism to normal accumulating condition.

When, during a grand total taking operation, a grand total is to be taken from front accumulator 150, link 235 is shifted forwardly to its grand total position, as hereinafter described, so that its other shoulder 243 engages a stud 244 on an arm 245 mounted on rock shaft 246 which is journaled in a suitable bracket in the same manner as rock shaft 239. An arm 247, mounted on the other end of rock shaft 246 is connected by link 248 to an arm 249 (Fig. 3) mounted on rear grand total shaft 160. Thus, when link 235 is pulled downwardly, while in engagement with stud 244, rear grand total shaft 160 is rocked counter-clockwise to set the several mechanisms of the computing mechanism for taking a grand total. The arrangement of shoulders 236 and 243 is such that when link 235 is pulled downwardly while in engagement with either stud 237 or 244, the vertical face of the opposite shoulder abuts the associated stud to prevent any forward or rearward movement of link 235.

Actuating mechanism of total taking control mechanism

The mechanism for actuating shaft 200 during total and grand total taking operations, includes a pair of snail cams 250 and 260 mounted on main drive shaft 10 (Figs. 5, 6, 14, 15, 20, 21). Cam 250 (Figs. 6 and 20, and Fig. 27, line 10) is arranged to elevate a follower roller 251, on arm 252 pivotally mounted on stud 253, at the time that eccentrics 31 have elevated the sensing pin box 20 to its highest position, i. e., at the end of a machine cycle. A push rod 254, connected to the forward end of arm 252 and guided in a suitable slot (not shown) in the frame of the machine, operates a spring-urged arm 255 pivotally mounted on a stud 256 in bracket 201. An actuating pawl 257 is pivoted on the rearmost end of arm 255 and is urged by spring 258 against a six-toothed ratchet 259 mounted on the extreme left end of shaft 200. The teeth on ratchet 259 are arranged in pairs and a blank space corresponding to one tooth is provided between each pair. Ratchet 259 is so mounted on shaft 200 that when the total taking control mechanism is at rest, during accumulating cycles, pawl 257 is moved idly against a blank space at each revolution of main drive shaft 10.

Cam 260 (Figs. 6 and 21, and Fig. 27, line 9) is similar in shape to cam 250, but, as hereinafter explained, is so mounted on shaft 10 as to be effective approximately 30° of a machine cycle thereafter, whereby it serves to elevate a follower roller 261 on arm 262, which is pivotally mounted on stud 253, shortly after pin box 20 has started downwardly, i. e., immediately after the beginning of a machine cycle. Connected to the forward end of arm 262 is a forked push rod 263 having a branch 264 arranged to operate a spring urged arm 265 pivotally mounted on stud 256. An actuating pawl 267 is pivoted on the rearward end of arm 265 and is urged by spring 266 against a three toothed ratchet 268. The teeth on ratchet 268 are equidistantly spaced and are so arranged that a blank space, corresponding to two teeth, is provided between the teeth. Ratchet 268 is so mounted on shaft 200 that its teeth are complementally arranged with reference to those on ratchet 259, whereby, when the control mechanism is at rest, a tooth on ratchet 268 is in position to be actuated by pawl 267. However, during accumulating cycles, a latch 270 engages a forward extension 269 on arm 265 to hold the arm in its fully raised position so that push rod 263 moves idly up and down under control of cam 260 during each revolution of shaft 10. Latch 270 is pivotally mounted on a stud 271, in bracket 201, and is provided with a vertical arm 272, urged clockwise by a suitable spring, having a roller 273 arranged to be operated when a card having a new designation is sensed by an arm 274, mounted on rock shaft 57 of the change of designation sensing mechanism.

With this arrangement, it is apparent that the rocking of shaft 57 serves to disengage retaining latch 270 from extension 269 and permit arm 265 to drop on branch 264 to push rod 263. As cam 260 revolves, it elevates push rod 263 and causes pawl 267 to rotate ratchet 268 and shaft 200, through one tooth space (first step of total taking operation—see Fig. 27, line 9, cycle 1) and thereby places the first of a pair of teeth on ratchet 259 in position to be actuated by pawl 257. At the end of the conditioning cycle, cam 250 elevates push rod 254 and causes pawl 257 to rotate ratchet 259 and shaft 200 through one tooth space (second step of total taking operation—see Fig. 27, line 10, cycle 1) and thereby places the second tooth of said pair in position to be actuated. At the end of the total taking cycle, cam 250 again elevates push rod 254 and causes pawl 257 to rotate ratchet 259 and shaft 200 through another tooth space (third step of total taking operation—see Fig. 27, line 10, cycle 2) and thereby places another tooth on ratchet 268 in position to be actuated by pawl 267. Obviously, if there were no provisions to the contrary, ratchet 268 would be operated again and the above sequence of operations would continue indefinitely. Therefore, means is provided to latch arm 265 in its fully raised position to insure that shaft 200 is actuated only three times during a total taking operation.

Figure 22:
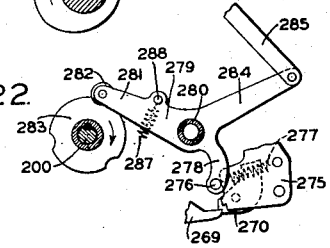
Figure 23:
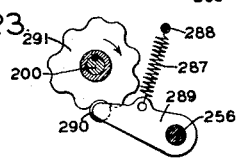
Figure 24:
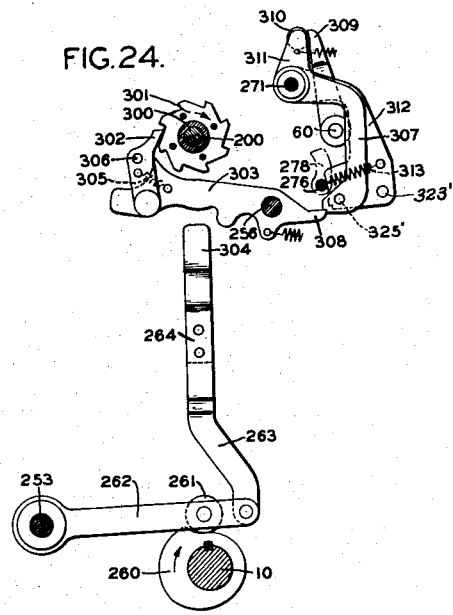
Figure 25:
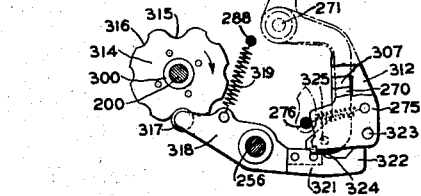
Figure 26:
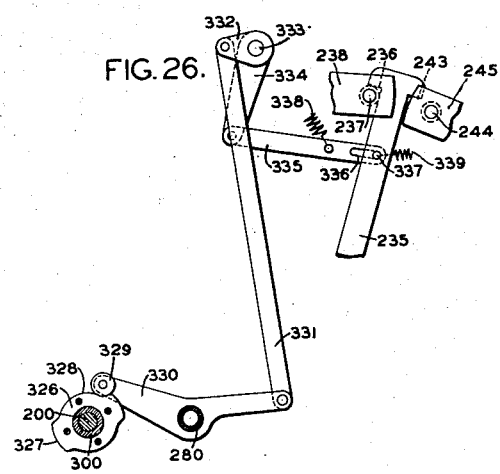

Although the spring on latch 270 serves to maintain the engagement of the latch with extension 269, to hold arm 265 in raised position during accumulating cycles, and tends to reestablish this relationship after a total taking operation is initiated, each adventitious change of designation that occurs during the total taking operation serves to rock shaft 57 counterclockwise and thereby disengage the latch from the extension. Inasmuch as the last adventitious change of designation occurs immediately before the third step of the total taking operation, latch 270 would be tripped at that time and permit arm 265 to drop against branch 264 of push rod 263 to cause a repetition of the above sesquence of operations. Therefore, an auxiliary latch 275, pivotally mounted on stud 271, is arranged to engage extension 269 during total taking operations but is held out of engagement therewith when the control mechanism is at rest by a stud 276, to which it is resiliently connected by spring 277, mounted on the downwardly extending arm 278 of a three armed lever 279 (Fig. 22). Lever 279 is pivotally mounted on a hollow shaft 280, mounted in bracket 201, and is provided with a rearwardly extending arm 281 having a follower roller 282 that rides on a cam 283 mounted on shaft 200. Cam 283 is provided with three equally spaced notches, one of which cooperates with roller 282 when the control mechanism is at rest.

As pawl 267 on arm 265 rotates ratchet 268, roller 282 rides out of the notch in cam 283, thereby rocking lever 279 clockwise which serves to move stud 276 away from the rearward face of latch 275 and permits spring 277 to draw the latch against the forward edge of extension 269. When arm 265 is raised to its highest position by cam 260, latch 275 snaps over extension 269 and serves to hold arm 265 in raised position during the conditioning and total taking cycles (see Fig. 27, line 11, cycle 1, and Fig. 27A, line 11, cycle 2). At the third step of the total taking operation, roller 282 rides down into another notch on cam 283 thereby rotating lever 279 counter-clockwise and causing stud 276 to force latch 275 out of engagement with extension 269. However, prior to the complete disengagement of auxiliary latch 275, retaining latch 270, which is but momentarily tripped by each adventitious change of designation, swings forwardly over extension 269 and holds arm 265 in fully raised position until the next change of designation is sensed.

The credit balance sensing mechanism referred to hereinabove is also operated during a total taking operation by cam 283 by means of a forwardly extending arm 284 on lever 279 which is connected by link 285 (Fig. 12) to an arm 286 mounted on credit balance shaft 135.

Lever 279 is urged counter-clockwise to force roller 282 against cam 283 by a spring 287 connected at one end to a stud 288 in arm 281 and, at the other, to a detent arm 289 (Fig. 23) pivotally mounted on stud 256. A follower roller 290 on arm 289 cooperates with nine equally spaced detents in a detent cam 291 mounted on shaft 200 and serves to center shaft 200 in each of its several positions.

When a card with a new grand group designation is sensed, the operation of mechanism additional to the actuating mechanism is initiated. The additional mechanism is operated through four steps in four machine cycles and serves to cause two successive operations of the actuating mechanism whereby shaft 200 is rotated through two-thirds of a revolution in six steps during four machine cycles. It is apparent that this movement causes two successive three step sequences of operation of cams 210, 220, and 230, for controlling first, a total taking cycle, second, a total taking cycle, third, the restoration of the control mechanism, fourth, a grand total conditioning cycle, fifth, a grand total taking cycle, and, sixth, the restoration of the control mechanism. In the first sequence, these cams cause the total to be taken from rear accumulator 100 in the manner described above. In the second, the additional mechanism serves to shift link 235 to its grand total position and cams 210, 220, and 230 cause the grand total to be taken from accumulator 150. However, it will be noted that the third actuation of shaft 200 restores the total control mechanism to ineffective position and thereby tends to permit the resumption of ordinary accumulating operations in the cycle following the total taking cycle. To prevent this occurrence, the actuating mechanism is arranged so that the third step, which occurs at a time when the regular operating mechanisms hold card stop 18 in effective position, and hold picker knife 15 in retracted position, is followed immediately by the fourth step which controls the grand total conditioning cycle. By this arrangement, the card with the new grand group designation is retained in the card chamber during the entire grand total taking operation and, at the end thereof, the data contained in the new card is tabulated in the usual manner.

The additional mechanism includes a sleeve 300 (Fig. 6) rotatably mounted on shaft 200, on which are mounted an eight toothed ratchet 301, a scalloped cam disc 314 and a cam 326. In the arrangement shown herein, the construction is such that a complete revolution of sleeve 300 is completed in eight steps. Therefore, since the cams mounted thereon perform their functions in four steps, each cam is provided with two separate working portions. Thus, after sleeve 300 is actuated through four steps, the cams thereon are, in effect, returned to their original positions. Ratchet 301 (Fig. 24) is arranged to be actuated once during each cycle of the grand total taking operation by a pawl 302 pivoted on a spring-urged arm 303 which is pivotally mounted on stud 256 and is arranged to be operated by cam 260 and branch 304 of push rod 263 (see Fig. 27, line 12). Pawl 302 is urged against the ratchet by a suitable spring 305 and its extent of movement, when out of engagement with the ratchet, is governed by a limit stud 306 that coacts with a portion of arm 303. During accumulating cycles, a latch 307, pivoted on stud 271, engages a forward extension 308 on arm 303 to hold the arm in its fully raised position wherein it is out of the path of movement of branch 304. When a grand group change of designation is sensed, an arm 309 on rock shaft 60 of the change of designation sensing mechanism, coacts with a roller 310 on a vertical arm 311 of latch 307, which is urged clockwise by a suitable spring, and serves to disengage the latch from extensions 308 whereby arm 303 is permitted to drop against branch 304.

When a card having a change in group designation is sensed, shaft 57 is rocked, as described above, to initiate a total taking operation. This occurrence, per se, is without effect on the additional mechanism. However, the retraction of locking slides 43 releases pins 42 in the grand group designating columns as well as in the group designating columns. Thus, each adventitious change of designation that occurs during a total taking operation rocks shaft 60, as well as shaft 57, and disengages latch 307 from extension 308. Therefore, to prevent arm 303 from dropping against branch 304, during total taking operations, an auxiliary latch 312, similar in function and manner of operation to latch 275, is pivotally mounted on stud 271 and is arranged to engage extension 308 during total taking operations but is held out of engagement therewith when the control mechanism is at rest by stud 276, to which it is resiliently connected by spring 313 (see Fig. 27, line 11, cycle 1, and Fig. 27A, line 11, cycle 2).

Disc 314 (Fig. 25, and Figs. 27 and 27A, line 13), which serves to position sleeve 300 independently of shaft 200 and to disable the latches for arms 265 and 303 during grand total taking operations, is provided with two diametrically arranged deep notches 315 and six shallow notches 316. When the control mechanism is at rest, a follower roller 317 on a lever 318, pivoted on stud 256, is held in a deep notch 315 by a spring 319 anchored on stud 288. Lever 318 is provided with a forked forward extension comprising two branches 321 (see also Fig. 6) and 321'. Branch 321 is provided with a forward face 322, adapted to coact with a stud 323 on auxiliary latch 275, and a cutaway shoulder 324, adapted to coact with a stud 325 on retaining latch 270. Branch 321' is provided with a forward face 322', adapted to coact with a stud 323' on auxiliary latch 312, and a cutaway shoulder 324' adapted to coact with a stud 325' on retaining latch 307. The arrangement is such that when sleeve 300 is rotated to place follower roller 317 in register with a shallow notch 316, lever 318 is rocked counter-clockwise so that studs 323 and 323' and studs 325 and 325' are cammed forwardly by faces 322 and 322' and shoulders 324 and 324', respectively, whereby auxiliary latches 275, 312 and retaining latches 270, 307 are held out of engagement with the forward extensions on actuating arms 265 and 303. At the fourth step of the ratchet 301, roller 317 rides into a deep notch 315, thereby rocking lever 318 clockwise to release retaining latches 270, 307 and auxiliary latches 275, 312, whereby the latches swing forwardly and engage extensions 269 and 308 to hold arms 265 and 303 in fully raised position.

Cam 326 (Figs. 6, 7, 26) which serves to shift total pull link 235 to its grand total position during the third cycle of a grand total taking operation, comprises two diametrically arranged, concentric high dwells 327 and two concentric low dwells 328 and serves to operate a roller 329 on lever 330 which is pivotally mounted on hollow shaft 280. The forward end of lever 330 is connected by link 331 to an arm 332 on rock shaft 333 on the other end of which is mounted an arm 334. Connected thereto is a link 335 having a slot 336 in its forward end that encompasses a stud 337 in total pull link 235. When the control mechanism is at rest, a strong spring 338 on link 335 urges follower roller 329 against the first portion of a low dwell 328 on cam 326 and serves to hold total link 235 in "total" position in which shoulder 236 is engaged with stud 237. When roller 329 rides onto a high dwell 327 (see Fig. 27A, line 14, cycle 3), lever 330 is rocked clockwise (Fig. 26) and serves to shift link 335 forwardly and permit a light spring 339, connected to stud 337, to draw link 235 into its "grand total" position in which shoulder 243 thereon engages stud 244.

To restore cam slides 51 of the change of destination sensing mechanism to their rearward position at the end of total taking and grand total taking operations, an arm 340 (Figs. 6, 20), having a rounded portion 341 adapted to coact with ratchet 259, is mounted on rock shaft 57. During accumulating cycles, rounded portion 341 is held out of engagement with the ratchet. When shaft 57 is rocked at the start of either a total taking or grand total taking operation, portion 341 is moved against a low portion of the ratchet. As the ratchet rotates, portion 341 is positively elevated to rock shaft 57 clockwise and thereby cause bail rod 55 to shift slides 51 to their rearward position.

*Operation of control mechanism during total taking operation*

With the above described mechanism in mind, let it be assumed that after a group of cards, having the same designation, is passed through the machine, a card having a new group designation is passed into the sensing chamber. As sensing pins 19 (Fig. 7) are elevated to set digit stops in the computing mechanism, in accordance with the perforations in the new card, one or more of the slides 51 in the columns comprising the group designating field are shifted forwardly and, by means of interponent 54, bail rod 55, shaft 57 and arm 274 (Fig. 6), serve to rock latch 270 counterclockwise to release arm 265 and initiate a total taking operation. As arm 265 drops downwardly against branch 264 of push rod 263 pawl 267 engages a tooth on ratchet 268. Immediately thereafter, cam 260 elevates push rod 263 to operate arm 265 and causes pawl 267 to rotate ratchet 268 through an angular distance equal to the pitch of one tooth and thereby rotate shaft 200 and the cams mounted thereon through one-ninth of a revolution. This movement constitutes the first step of a total taking operation (see Fig. 27, cycle 1, lines 5, 6, 7, 9 and 11) and serves to convert the cycle, that began as an ordinary accumulating cycle, into a total conditioning cycle, in that—

1. Cam 210 is rendered effective to lock the card feeding mechanism in fully retracted position to prevent card feeding.
2. Cam 220, by means of arm 224, is rendered effective to retain card stop 18 in its lower position to hold the new card in the card chamber.
3. Cam 220, by means of arm 225, also serves to retract all locking slides 43 to release all pins 42 and prevent the setting of stops in the computing mechanism.
4. Cam 283, by means of arm 284 on lever 279, serves to operate the credit balance sensing mechanism to determine the set of actuating racks with which accumulator 100 is to be engaged during the total taking cycle. In addition, arm 278 on lever 279 releases auxiliary latches 275, 312 and permits them to engage extensions 269, 308 whereby arms 265, 303 are retained in elevated position.

During the conditioning cycle the computing mechanism is set to cause the total of the preceding group of cards to be taken from accumulator 100. At the end of the conditioning cycle, ratchet 259, having been shifted to place a tooth thereon in position to be engaged by pawl 257, is actuated by cam 250. This movement constitutes the second step of the total taking operation (see Fig. 27, cycle 1, lines 5, 6, 7, 8, 10 and 11) and serves to position the cams on shaft 200 for controlling the total taking cycle, in that, 1. Cam 210 retains the card feeding mechanism in retracted position.
2. Cam 220, by means of arm 224, continues to retain card stop 18 in its lower position.
3. Cam 220, by means of arm 225, continues to retain locking slides 43 in retracted position to prevent the setting of digit stops.
4. Cam 283 serves to retain the credit balance mechanism in operated position whereby, if the total is negative, accumulator 100 is retained in engagement with subtracting racks 103.
5. Cam 230 serves to pull link 235 downwardly and hold it in this position during the total taking cycle, whereby front total shaft 140 is rocked to control the total taking operations of the computing mechanism.

At the end of the total taking cycle, ratchet 259, having been shifted to place another tooth thereon in position to be engaged by pawl 257, is again actuated by cam 250. This movement constitutes the third step of the total taking operation (see Fig. 27A, cycle 2, lines 5, 6, 7, 8, 10, and 11) and serves to restore the control mechanism to its rest position as shown in the drawings whereby, since the card feeding, card stop and retract mechanisms are returned to the control of their usual operating cams, 30, 40, and 50, respectively, ordinary accumulating operations are resumed and the card with the new group designation is tabulated in the cycle following the total taking cycle.

*Operation of control mechanism during grand total taking operation*

When a card with a new grand group designation is sensed, one or more of the slides 51 in the columns comprising the grand group designating field are shifted forwardly and, by means of shafts 57, 60, serve to rock latches 270, 307 counter-clockwise to release arms 265, 303 and initiate a grand total taking operation. As arms 265, 303 drop downwardly against branches 264, 304 of push rod 263, pawls 267, 302 engage teeth on ratchets 268, 301, respectively. Immediately after the beginning of the cycle, cam 260 elevates push rod 263 to operate arms 265 and 303 simultaneously, thereby causing pawl 267 to rotate ratchet 268 through an angular distance equal to the pitch of one tooth, whereby shaft 200 and the cams mounted thereon are rotated through one-ninth of a revolution, and causing pawl 302 to rotate ratchet 301 through an angular distance equal to the pitch of one tooth, whereby sleeve 300 and the cams mounted thereon are rotated through one-eighth of a revolution. This movement constitutes the first step of a grand total taking operation (see Fig. 27, cycle 1, lines 5, 6, 7, 9, 12 and 13) and serves to set the several mechanisms for controlling a total conditioning cycle, in which the function of cams 210, 220, 230, and 283 are the same as during a total taking operation with the result that the new card is retained in the card chamber and accumulator 100 is conditioned for a total taking operation. However, since roller 317 on lever 318 is now in a shallow notch in cam 314, cam faces 322 and shoulders 324 on extensions 321 of lever 318 serve to hold auxiliary latches 275, 312 and retaining latches 270, 307 out of engagement with extensions 269, 308 whereby arms 265, 303 follow push rod 263 downwardly.

At the end of the total conditioning cycle, ratchet 259, having been shifted to place a tooth thereon in position to be engaged by pawl 257, is actuated by cam 250. This movement constitutes the second step of the grand total taking operation (see Fig. 27, cycle 1, lines 5, 6, 7, 8 and 10) and serves to position the cams on shaft 200 for controlling the total taking cycle in the same manner as during a total taking operation, in which the last group total is rolled out of accumulator 100 during the forward movement of the actuating racks, printed on the report sheet, and transferred to accumulator 150 as the actuating racks are returned. Shortly after the beginning of the total taking cycle (see Fig. 27A, cycle 2, line 12), cam 260 elevates push rod 263 to operate arms 265 and 303. Inasmuch as pawl 267 is now in register with a blank space on ratchet 268, pawl 267 moves idly and shaft 200 is not stepped. However, pawl 302, being in position to engage a tooth on ratchet 301, serves to rotate sleeve 300 through one tooth space relative to shaft 200. In this position of sleeve 300, disc 314 continues to hold the retaining and auxiliary latches out of engagement with the extensions on arms 265 and 303, and roller 329, of the total pull link shifting mechanism, continues to ride on the low portion of cam 326.

At the end of the total taking cycle, ratchet 259, having been shifted to place another tooth thereon in position to be engaged by pawl 257, is again actuated by cam 250. This movement constitutes the third step of the grand total taking operation (see Fig. 27A, cycle 2, lines 5, 6, 7, 8, and 10) and serves to restore the cams on shaft 200 to their original position as shown in the drawings. In this position of the mechanism, as stated under the heading "Operation of control mechanism during total taking operation," the card stop and card feeding mechanisms are returned to the control of their usual operating cams to permit resumption of ordinary accumulating operations. However, since retaining latches 270, 307 and auxiliary latches 275, 312 are held out of engagement with extensions 269, 308 (see Fig. 27A, cycle 2, line 13), arms 265 and 303 are in position to be actuated by push rod 263 to effect a second sequence of operations of cams 210, 220, and 230.

As shaft 10 continues to rotate, cam 260 elevates push rod 263 to cause pawl 267, which is now in position to engage a tooth on ratchet 268, to rotate shaft 200 through one tooth space. This movement constitutes the fourth step of a grand total taking operation (see Fig. 27A, cycle 3, lines 5, 6, 7, and 9) and serves to position the cams on shaft 200 for controlling the grand total conditioning cycle, in which cam 210 is again effective to retain the card feeding mechanism in retracted position and cam 220 again serves to retract locking slides 51 and to hold card stop 18 in its lower position. The arrangement of cams 250 and 260 is such that, in a grand total taking operation, during the interval between the third actuation of shaft 200 under control of cam 250 and the fourth actuation of shaft 200 under control of cam 260 (see Fig. 27A, lines 2 and 3), cam 30 serves to hold the card feeding mechanism in retracted position and cam 40 serves to hold card stop 18 in its lower position, whereby card feeding is suspended and the new card is retained in the sensing chamber. Thus, the cycle immediately following the total taking cycle, which would be an accumulating cycle if a change in group designation had been sensed, is converted into a grand total conditioning cycle during a grand total taking operation.

Simultaneously with the actuation of shaft 200, arm 303 is elevated by branch 304 and causes pawl 302, which is engaged with another tooth on ratchet 301, to rotate sleeve 300 through one tooth space (see Fig. 27A, cycle 3, lines 12, 13 and 14). This movement places roller 317 in register with another shallow notch 316 on disc 314 to hold the retaining and auxiliary latches disengaged, and, places a high dwell 327 on cam 326 in register with roller 329 to rock lever 330 clockwise, thereby shifting link 335 forwardly to permit spring 339 to shift link 235 into its "grand total position."

At the end of the grand total conditioning cycle, ratchet 259, having been shifted to place a tooth thereon in position to be engaged by pawl 257, is actuated by cam 250. This movement constitutes the fifth step of the grand total taking operation (see Fig. 27A, cycle 3, lines 5, 6, 7, 8, and 10) and serves to position the cams on shaft 200 for controlling the grand total taking cycle, in which the grand total of the several group totals is rolled out of accumulator 150. During this cycle, cams 210 and 220 function, as above, to prevent card feeding, hold card stop 18 in effective position, and release locking slides 51, and cam 230 serves to pull link 235 downwardly, whereby rear grand total shaft 160 is rocked to control the grand total taking operations of the computing mechanism.

Shortly after the beginning of the grand total taking cycle (see Fig. 27A, cycle 4, lines 12, 13, and 14), cam 260 elevates push rod 263 to operate arms 265 and 303. Inasmuch as pawl 267 is now in register with a blank space on ratchet 268, pawl 267 is moved idly and shaft 200 is not stepped. However, pawl 302, being in position to engage a tooth on ratchet 301, serves to rotate sleeve 300 through one tooth space relative to shaft 200. This movement returns sleeve 300 to the position shown in the drawings and places a deep notch 315 on disc 314 in register with follower 317, thereby permitting lever 318 to be rocked clockwise by spring 319 to disengage cam faces 322 and shoulders 324 from studs 323 and 325, whereby auxiliary latches 275, 312 and retaining latches 270, 307 are released and swing clockwise, under control of their respective springs, to engage extensions 269, 308 and latch arms 265 and 303 in fully raised position to prevent further actuation of sleeve 300 by pawl 302, and of shaft 200 by pawl 267.

At the same time, follower 329 rides off the high dwell 327 of cam 326 and spring 338 tends to restore link 235 to its "total" position. However, since cam 230 holds link 235 in its lower position, in which the rearward face of shoulder 236 abuts stud 237, link 235 remains engaged with stud 244 to hold rear grand total shaft 160 rocked throughout the cycle.

At the end of the grand total taking cycle, ratchet 259, having been shifted to place another tooth thereon in position to be engaged by pawl 257, is again actuated by cam 250. This movement constitutes the sixth step of the grand total taking operation (see Fig. 27A, cycle 4, lines 5, 6, 7, 8, and 10) and serves to restore the mechanism to the position shown in the drawings, in which, the card feeding mechanism is released from the control of cam 210 and restored to the control of its usual operating cam 30; the card stop mechanism is released from the control of cam 220 and restored to the control of its usual operating cam 40; mechanism for retracting locking slides 43 is released from the control of cam 220 and restored to the control of its usual operating cam 50; total link 235, having been released by cam 230, is restored to "total" position by spring 338; auxiliary latches 275, 312 are disengaged from extensions 269, 308 by stud 276, leaving retaining latches 270, 307 to hold arms 265, 303 in raised position; and, since ratchet 259 has been stepped to place a blank space in register with pawl 257, arm 255 is operated idly during the succeeding accumulating cycles. Since the control mechanism is returned to its rest position at the time sensing pin box 20 is in its highest position, slides 43 lock pins 42, that were raised in accordance with the perforations in the new card, in their elevated position and they, in turn, set stops in the computing mechanism, so that the data contained in the card with the new grand group designation is tabulated in the cycle after the grand total taking cycle.

*Recapitulation*

To sum up the manner in which group total taking and grand total taking operations are effected, the several steps of the total taking control mechanism, during each type of operation, are briefly reviewed.

When a group total taking operation is initiated, shaft 200 and its associated elements (cams 210, 220, and 230) are actuated through a three step sequence of operations. As heretofore described, shaft 200 may be actuated either by cam 250 or cam 260. These cams are offset, relative to each other, so that each may cause an actuation of shaft 200 at different times in the same machine cycle. This arrangement, in addition to the arrangement of the teeth on ratchets 259 and 268, is such that shaft 200 is actuated twice during the first cycle and once during the second cycle of a group total taking operation. In the first cycle, the first actuation of shaft 200 is effected immediately after the beginning of the cycle by cam 260, whereas the second actuation of shaft 200 is effected at the end of the cycle by cam 250. In the second cycle, shaft 200 is actuated at the end of the cycle by cam 250. The several steps through which shaft 200 is operated during a group total taking operation are as follows:

1. The first step of shaft 200 is effected by cam 260 immediately after the beginning of the cycle following the sensing of a change in group designation and serves to position cams 210, 220 and 230 so that the cycle, which began as an ordinary accumulating cycle, is converted to the first or group total conditioning cycle of a group total taking operation.

2. The second step of shaft 200 is effected by cam 250 at the end of the first or group total conditioning cycle and serves to position cams 210, 220 and 230 for causing the second or group total taking cycle of a group total taking operation.

3. The third step of shaft 200 is effected by cam 250 at the end of the second or group total taking cycle and serves to normalize cams 210, 220 and 230 whereby the machine is conditioned to resume ordinary accumulating operations in the succeeding cycle.

Thus, shaft 200 is actuated through three steps during the two machine cycles required for a group total taking operation. As a result, cams 210, 220, and 230 are rotated through a three-step sequence of operation during which the group total is taken from rear accumulator 100, printed on the report sheet, and transferred to front accumulator 150.

When a grand group total taking operation is initiated additional mechanism, comprising sleeve 300, serves to cause two successive three-step sequences of operation of shaft 200 and its associated elements (cams 210, 220, 230). As heretofore described, sleeve 300 is arranged to be actuated only by cam 260 immediately after the beginning of each cycle of the grand total taking operation, whereas, due to the offset relationship of cams 250 and 260 and the arrangement of teeth on ratchets 259 and 268, shaft 200 may be actuated at different times in the same cycle. The latter arrangement is such that shaft 200 is actuated twice during the first cycle, once during the second cycle, twice during the third cycle, and once during the fourth cycle of the grand total taking operation. In both the first and third cycles, the first actuation of shaft 200 is effected immediately after the beginning of the cycle by cam 260, and the second actuation of shaft 200 is effected at the end of the cycle by cam 250. In both the second and fourth cycles, shaft 200 is actuated at the end of the cycle by cam 250. The several steps through which shaft 200 and sleeve 300 are operated during a grand total taking operation are as follows:

1. The first step of shaft 200 is effected by cam 260 immediately after the beginning of the cycle following the sensing of a change in grand group designation and serves to position cams 210, 220 and 230 so that the cycle which began as an ordinary accumulating cycle is converted into the first or group total conditioning cycle of the grand total taking operation. This movement occurs simultaneously with the first step of sleeve 300 which is also effected by cam 260.

2. The second step of shaft 200 is effected by cam 250 at the end of the first or group total conditioning cycle and serves to position cams 210, 220, and 230 for causing the second or group total taking cycle of a grand total taking operation. Immediately after the beginning of the second or group total taking cycle, sleeve 300 is actuated a second step by cam 260.

3. The third step of shaft 200 is effected by cam 250 at the end of the second or group total taking cycle and serves to normalize cams 210, 220, and 230 whereby the machine tends to resume ordinary accumulating operations in the succeeding cycle.

4. The fourth step of shaft 200 is effected immediately after the beginning of the cycle following the second or group total taking cycle of a grand total taking operation and serves to position cams 210, 220 and 230 so that the cycle following the group total taking cycle, which began as an ordinary accumulating cycle, is converted into the third or grand total conditioning cycle of a grand total taking operation. This movement occurs simultaneously with the third step of sleeve 300 which is also effected by cam 260.

5. The fifth step of shaft 200 is effected by cam 250 at the end of the third or grand total conditioning cycle and serves to position cams 210, 220, and 230 for causing the fourth or grand total taking cycle of a grand total taking operation. Immediately after the beginning of the fourth or grand total taking cycle, sleeve 300 is actuated a fourth step by cam 260.

6. The sixth step of shaft 200 is effected by cam 250 at the end of the fourth or grand total taking cycle and serves to normalize cams 210, 220 and 230 whereby the machine is conditioned to resume ordinary accumulating operations in the succeeding cycle.

Thus, shaft 200 is actuated through six steps during the four machine cycles required for a grand total taking operation. As a result, the cams 210, 220 and 230 are rotated through two successive three-step sequences of operation. During the first sequence, the last group total is taken from rear accumulator 100, printed on the report sheet, and transferred to the front accumulator 150. During the second sequence, the grand total is taken from front accumulator 150 and is printed on the report sheet.

While I have described what I consider to be a highly desirable embodiment of the invention, it is obvious that many changes in form could be made without departing from the spirit of the invention, and I, therefore, do not wish to be limited to the exact form herein shown and described, nor to anything less than the whole of the invention as hereinbefore set forth, and as hereinafter claimed.

What is claimed as new, and desired to secure by Letters Patent, is:

1. In a record controlled tabulating machine having means for sensing group and grand group designations in successively fed records, means controlled thereby for detecting changes in group or grand group designations, a first and a second accumulator, means for inserting amounts therein, and means individual to each of said accumulators arranged when actuated to condition the machine for causing the associated accumulator to yield its total, the combination of a single means for actuating either of said conditioning means, said actuating means being normally arranged to actuate the conditioning means of the first accumulator, a control means to control machine functions incident to total taking operations, said control means including means to operate said actuating means, means for operating said control means through a predetermined sequence of operation required for total taking, means controlled by said change of designation detecting means for rendering said operating means effective to operate said control means through said predetermined sequence of operation when any change in designation is detected, additional means for controlling said operating means to cause successive sequences of operation of said control means, means for operating said additional means concurrently with said control means, means controlled by said change of designation detecting means to initiate the operation of said last named operating means when a change in grand group designation is detected, and means controlled by said additional means to shift the control of said actuating means to the conditioning means of the second accumulator during the second sequence of operation of said control means.

2. In a record controlled tabulating machine having means for sensing group and grand group designations in successively fed records, means controlled thereby for detecting changes in group or grand group designations, a first and a second accumulator, means for inserting amounts therein, and means individual to each of said accumulators arranged when actuated to condition the machine for causing the associated accumulator to yield its total, the combination of a single means for actuating either of said conditioning means, impositive means to engage said actuating means with the conditioning means of the first accumulator, a control means to control machine functions incident to total taking operations, said control means including means to operate said actuating means, means for operating said control means through a predetermined sequence of operation required for total taking, means controlled by said change of designation detecting means for rendering said operating means effective to operate said control means through said predetermined sequence of operation when any change in designation is detected, additional means for controlling said operating means to cause successive sequences of operation of said control means, means for operating said additional means concurrently with said control means, means controlled by said change of designation detecting means to initiate the operation of said last named operating means when a change in grand group designation is detected, and means controlled by said additional means to shift the control of said actuating means to the conditioning means of the second accumulator against the tension of said impositive means during the second sequence of operation of said control means.

3. The invention set forth in claim 2 wherein the last recited means comprises means operated by the additional means to release the actuating means from the control of said impositive means during the second sequence of operation of said control means, and a second impositive means thereupon effective to engage the actuating means with the conditioning means of the second accumulator.

4. In a record controlled tabulating machine having means for sensing group and grand group designations in successively fed records, means controlled thereby for detecting changes in group and grand group designations, a plurality of accumulators, means for inserting amounts therein, and means individual to each of said accumulators arranged when actuated to condition the machine for causing the associated accumulator to yield its total, the combination of a single means for actuating either of said conditioning means, said actuating means being normally arranged to actuate the conditioning means of one accumulator, a control means to control machine functions incident to total taking operations, said control means including means to operate said actuating means, means for operating said control means through a predetermined sequence of operation required for total taking, means controlled by said change of designation detecting means for rendering said operating means effective to operate said control means through said predetermined sequence of operation when any change in designation is detected, additional means for controlling said operating means to cause successive sequences of operation of said control means, means for operating said additional means concurrently with said control means, means controlled by said change of designation detecting means to initiate the operation of said last named operating means when a change in grand group designation is detected, and means controlled by said additional means to shift the control of said actuating means to the conditioning means of another accumulator during a sequence of operation of the control means following the first sequence of operation thereof.

5. In a record controlled tabulating machine having means for sensing group and grand group designations in successively fed records, means controlled thereby for detecting changes in group and grand group designations, a first and a second accumulator, means for inserting amounts therein, and means individual to each of said accumulators arranged when actuated to condition the machine for causing the associated accumulator to yield its total, the combination of a single means for actuating either of said conditioning means, said actuating means being normally arranged to actuate the conditioning means of the first accumulator, a control means to control machine functions incident to total taking operations, means for operating said control means through a three step sequence of operation required for total taking, said sequence comprising a first step whereby the control means is rendered effective to control a blank or total conditioning cycle of machine operation, a second step whereby the control means is rendered effective to control a total taking cycle of machine operation, and a third step whereby the control means is restored to ineffective position, means forming a part of said control means to operate said actuating means during the total taking cycle of a sequence of operation, means controlled by said change of designation detecting means for rendering said operating means effective to operate said control means through said predetermined sequence of operation when any change in designation is detected, additional means for controlling said operating means to cause successive sequences of operation of said control means, means for operating said additional means concurrently with said control means, means controlled by said change of designation detecting means to initiate the operation of said last named operating means when a change in grand group designation is detected, and means controlled by said additional means to shift the control of said actuating means to the conditioning means of the second accumulator during the total conditioning cycle of the second sequence of operation of the control means, whereby said actuating means is rendered effective by the control means to condition the machine for causing the second accumulator to yield its total during the total taking cycle of the second sequence of operation.

WILLIAM W. LASKER, Jr.,
*Executor of the Estate of William W. Lasker, Deceased.*